United States Patent [19]
Burch

[11] Patent Number: 5,805,170
[45] Date of Patent: Sep. 8, 1998

[54] SYSTEMS AND METHODS FOR WRAPPING A CLOSED POLYGON AROUND AN OBJECT

[75] Inventor: Warren Lee Burch, Redmond, Wash.

[73] Assignee: Microsoft Corporation, Redmond, Wash.

[21] Appl. No.: 646,129

[22] Filed: May 7, 1996

[51] Int. Cl.[6] .................................................. G06F 15/62
[52] U.S. Cl. ........................... 345/433; 345/434; 345/441
[58] Field of Search .................................... 345/441, 434, 345/118, 429, 443

[56] References Cited

U.S. PATENT DOCUMENTS

| | | | |
|---|---|---|---|
| 4,723,209 | 2/1988 | Hernandez et al. | 364/300 |
| 4,723,211 | 2/1988 | Barker et al. | 364/300 |
| 4,739,477 | 4/1988 | Barker et al. | 364/300 |
| 4,829,470 | 5/1989 | Wang | 345/118 |
| 5,341,465 | 8/1994 | Goto | 395/434 |
| 5,355,446 | 10/1994 | Maayan | 395/434 |

OTHER PUBLICATIONS

"A Fast Sequential Method of Polygonal Approximation of Digitized Curves" by Wall and Danielson, Computer Vision, Graphics and Image Processing 28,220–227 (1984).

*Primary Examiner*—Anton Fetting
*Assistant Examiner*—Huedung X. Cao
*Attorney, Agent, or Firm*—Jones & Askew, LLP

[57] ABSTRACT

A system and methods for wrapping a closed polygon around an object represented in a computer system, where the closed polygon is substantially adjacent to the object without intersecting or clipping the object. The system and methods are especially useful for fitting text close to the object in a word processor or page layout system. The method involves dividing the object into a number of horizontal threshold bands. Four points are sequentially positioned within each threshold band along the edge of the object in the band. The first and last points are located proximate to the object on the horizontal boundaries of the threshold band, but do not intersect the object. The middle points are located at the intersections of three defined lines. In this configuration, line segments between any of the four points do not and cannot intersect the object. The step of placing four points along the side of the object within a threshold band is repeated within each of the threshold bands along both sides of the object to form a set of polygon points. This set of polygon points is then sequentially connected to form the closed polygon that wraps around the object. Text can then be flowed around the object without any clipping of the object.

23 Claims, 19 Drawing Sheets

SYSTEMS AND METHODS FOR WRAPPING A CLOSED POLYGON AROUND AN OBJECT

TECHNICAL FIELD

This invention relates to an improved system for wrapping a closed polygon around an object. More particularly, this invention relates to an improved system for encompassing an object with a non-intersecting closed polygon in order to flow text around the object without clipping or cutting off any part of the object.

BACKGROUND OF THE INVENTION

Combining images with text can transform a mediocre manuscript into an elegant and eye-catching document that lures a prospective reader to start reading and coaxes them to continue reading. Advertisers and marketers have been keenly aware of the power of well placed images in their materials for a long time. Recently, more traditional forms of media have picked up on this idea. For example, the "USA TODAY" newspaper has gained popularity because of, amongst other things, its clever and attractive mix of text and graphic images.

In the past, graphic images and text have been integrated by using expensive manual typesetting procedures that were time consuming and required a great deal of skill. However, mixing graphic images with text is no longer limited to those capable of affording these manual typesetting procedures. Inexpensive personal computers, high-resolution laser printers, and powerful desktop publishing software have empowered small businesses, social organizations, churches, and other computer literate individuals to combine images with text to produce attractive documents.

In combining images with text in a document, it is highly desirable to have text tightly and gracefully wrap around the contours of the graphic image without overlapping onto or touching the graphic image. By flowing text tightly around the image, a more professional looking document is produced. To generate an attractive document combining text with a graphic image, a clipping region is typically placed around the graphic image. This border acts to separate the text from the graphic image to avoid the possibility of printing text over top of the graphic image. The created border does not let any part of the graphic image be displayed outside the border, thus "clipping" any portion of the graphic image crossing or intersecting the border. Ideally, the border does not touch the image or clip off any portion of the image. This is relatively easy for simply shaped images but becomes difficult for irregularly shaped images.

Objects other than graphic images can also be wrapped by such closed polygons. An object can be a graphic image, text, a combination of both graphics and text, or a combination of objects so long as there is a boundary defining each edge of the object.

Some desktop publishing applications or word processing applications allow a user to manually draw a border or create a polygon that encompasses an inserted object. However, this requires some dexterity and skill on the part of the user and can often be a time consuming process for a complex or irregularly shaped object. One would have to painstakingly place each point of the border or polygon along the edge of the object while monitoring the location of the point. The polygon would "clip" the object if a line segment between any two sequential points intersects the object. Even if one manually places the border or polygon, there is no guarantee, other than relying on the user's own observation, that the object has not been clipped. As a result, wrapping the object can take a long time and it remains the user's responsibility to verify that the polygon has been placed about the object without clipping any part of the object.

In an effort to solve this problem, some desktop publishing applications have the capability of automatically generating a closed polygon encompassing the object. This is a relatively simple process for a square or rectangular graphic image, but problems can arise for more complex and irregularly shaped objects.

In automatically generating a closed polygon, the object is typically separated into horizontal bands in the process. These horizontal bands break up the perimeter of the object into manageable segments. A single polygon point is placed outside but proximate to the edge of the object and within the middle of each horizontal band. Thus, a set of polygon points can be placed in a perimeter surrounding the object and can be connected to form the closed polygon. For example, the Microsoft "Publisher" application program (version 2.0) can automatically wrap an object using this technique, but clipping may still occur for certain irregularly shaped graphic images. By increasing the number of horizontal bands, the possibility of clipping the object can be reduced, but not eliminated. However, increasing the number of horizontal bands creates additional problems. Computer processing time and usage of computer memory undesirably increases. This solution may also create a polygon that is difficult to manually edit because it contains so many polygon points. In general, simply increasing the number of bands does not guarantee that a closed polygon can be generated to encompass an object without clipping the object.

Therefore, there is a need for an improved system of wrapping a closed polygon around an object, where in the closed polygon is substantially adjacent to the object without intersecting it. This improved system would efficiently use computer resources to create a closed polygon substantially adjacent to both simple and complex-shaped objects to support the wrapping of text around the object in a computer created document.

SUMMARY OF THE PRESENT INVENTION

The present invention satisfies the above described needs by providing an improved system for wrapping a closed polygon around an object where the closed polygon is substantially adjacent to the object without intersecting or clipping it. An object can be a graphic image, text, a combination of both graphics and text, or a combination of objects so long as there is a boundary defining each edge of the object.

In general, the object is divided into a number of horizontal threshold bands. Within each threshold band, four points are sequentially positioned along the edge of the object. The first and last points are located immediately proximate to the object on the horizontal boundaries of the threshold band, but do not intersect the object. The middle points lie at the intersections of three lines: a horizontal line containing the first point, a horizontal line containing the last point, and a vertical line just outside the outer most point of the object within the threshold band. In this configuration, line segments between any of the four points do not and cannot intersect the object.

This process of placing four points along the side of the object within a threshold band is then repeated within each of the threshold bands to form a list of polygon points. This list of polygon points is then sequentially connected to form the closed polygon that wraps around the object.

Additionally, before connecting the list of polygon points, the middle points positioned within each threshold band may be individually adjusted by incrementally moving one of the middle two points towards the remaining of the middle two points along the vertical line until line segments between any of the four points is about to clip or intersect the object. The middle points may then be simultaneously adjusted by incrementally moving one of the middle points towards the first point while incrementally moving the remaining middle point towards the last point. This is performed until line segments between any of said four points is about to clip or intersect the object.

More particularly described, the object is divided into a series of horizontal threshold bands. Positioning of polygon points begins on the left-side of the object in the top threshold band. Within a given threshold band, point A is positioned immediately proximate to the top most part of the object, point B is positioned on the horizontal line containing point A but to the left of the leftmost set point of the object in the band, point C is positioned on the horizontal line containing the bottom most part of the object within the band and to the left of the leftmost set point of the object within the band, and finally point D is positioned immediately proximate to the bottom most part of the object within the band. None of points A–D are positioned on the object. Point B is moved down vector BC until vector AB is about to clip the object. Point C is moved up vector BC until vector CD is about to clip the object. Points B and C are moved across vectors AB and CD, respectively, until vector BC is about to clip the object. Points A, B, and C are added to a list of left-side polygon points and the process continues down the threshold bands of the left-side of the object. The above-described steps are repeated, starting at the bottom threshold band, for points being placed on the right-side of the object to form a list of right-side polygon points. The left-side and right-side polygon points are then sequentially connected to form a closed polygon which is substantially adjacent to the object without intersecting it.

It is therefore an advantage of the present invention to provide an improved method for wrapping a closed polygon around an object without intersecting or clipping the object.

It is a further advantage of the present invention to provide an improved method for creating a closed polygon wrapping around an object without intersecting the object, whereby the closed polygon is automatically generated by a computer implemented process.

It is a further advantage of the present invention to provide an improved method for wrapping a closed polygon substantially adjacent to an object without intersecting the object, whereby the closed polygon is not difficult to manually edit.

It is a further advantage of the present invention to provide an improved method for wrapping a closed polygon substantially adjacent to an object without intersecting the object, whereby computer processing time and computer memory usage is minimized.

These and other advantages of the present invention will be appreciated from studying the following detailed description and drawings, and the appended claims.

BRIEF DESCRIPTION OF THE DRAWINGS

FIGS. 13A–13K, collectively described as FIG. 13, are flow diagrams illustrating the method of the present invention in detail as implemented by an application program running on a personal computer.

DETAILED DESCRIPTION OF THE EMBODIMENT

Figure 1:
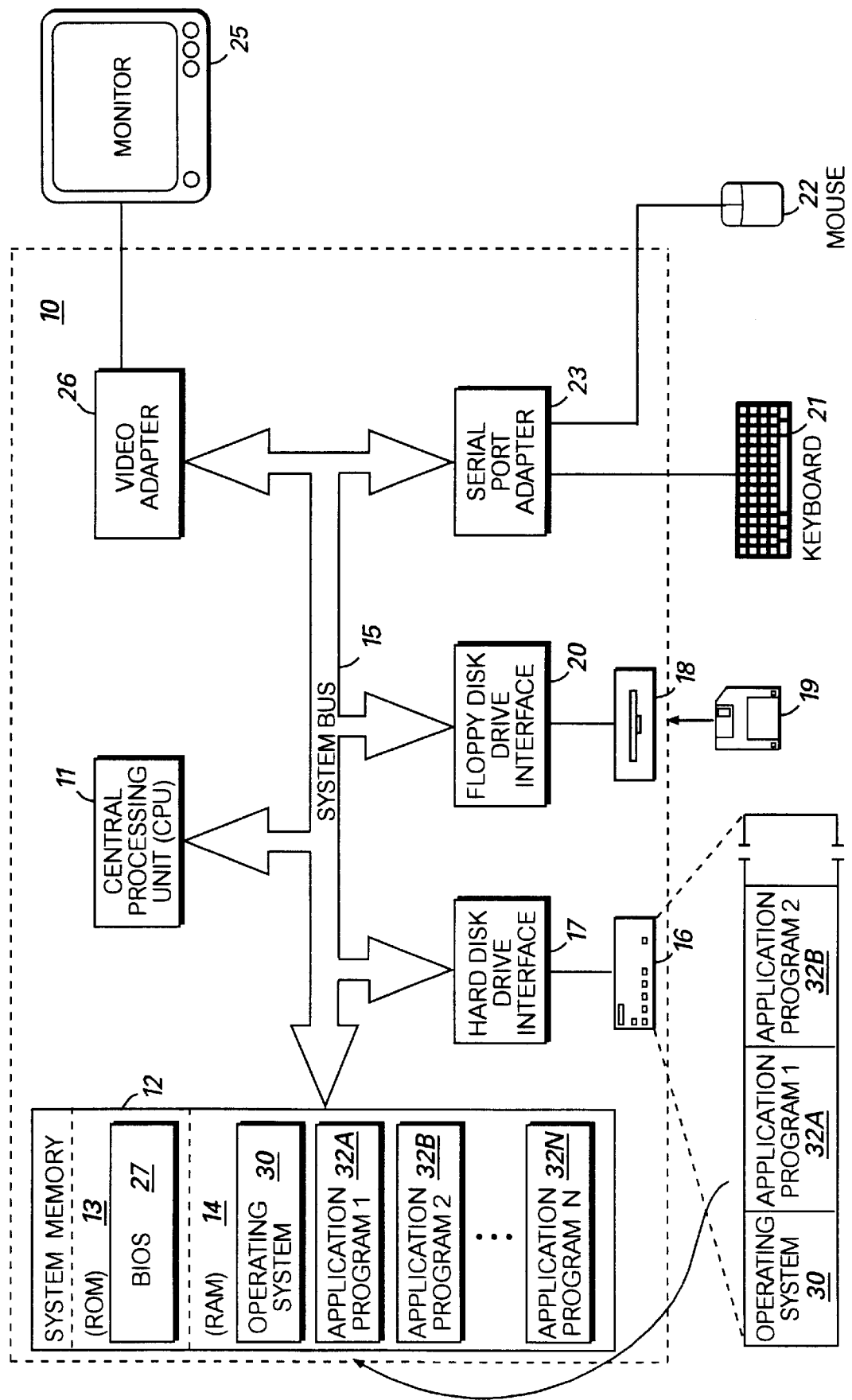
FIG. 1 is block diagram of a personal computer suitable for use in implementing the present invention.

The present invention is directed to a system for wrapping a closed polygon around an object where the closed polygon is substantially adjacent to the object without intersecting it. A closed polygon is created that encompasses the object. The points of the closed polygon are chosen to be substantially adjacent to the object and at the same time positioned to ensure that the object is not clipped by the closed polygon. Although the preferred embodiment will be generally described in the context of an application program and an operating system running on a personal computer, those skilled in the art will recognize that the present invention also can be implemented in conjunction with other program modules for other types of computers.

Turning first to the nomenclature of the specification, the detailed description which follows is represented largely in terms of processes and symbolic representations of operations by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. An example of such a data structure is a bitmap image or metafile. Such data structures impose a physical organization upon the collection of data bits stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, altering, changing, etc. which are often associated with manual operations performed by a human operator. The operations described herein are machine operations performed in conjunction with a human operator or user that interacts with the computer. The machines used for performing the operation of the present invention include general purpose digital computers or other similar computing devices.

In addition, it should be understood that the programs, processes, method, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the drawings, in which like numerals represent like elements throughout the several figures, the present invention and the preferred operating environment will be described.

The Operating Environment

FIG. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional IBM-compatible personal computer 10 suitable for implementing the present invention. As shown in FIG. 1, the personal computer 10 includes a central processing unit (CPU) 11, such as the 80486 or "PENTIUM" microprocessors manufactured by Intel Corporation of Santa Clara, Calif. The personal computer also includes system memory 12 (including read only memory (ROM) 13 and random access memory (RAM) 14), which is connected to the CPU by the system bus 15. A hard disk drive 16 is connected to the system bus 15 via the hard disk drive interface 17. A floppy disk drive 18, which is used to read or write a floppy disk 19, is connected to the system bus 15 via a floppy disk drive interface 20. Input devices such as a keyboard 21 and a mouse 22 are connected to the system bus 15 via a serial port adapter 23. A monitor 25 or other kind of display device is connected to the system bus 15 via a video adapter 26.

Although many other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as the operating system 30, application programs 32, and data are provided to the personal computer 10 via one of its memory storage devices, which may include the hard disk drive 16, floppy disk 19, RAM 14, ROM 13, and a CD-ROM (not shown). In the preferred personal computer 10, the hard disk drive 16 is used to store data and programs, including the operating system and application programs.

When the personal computer 10 is turned on or reset, the Basic Input/Output System (BIOS) 27, which is stored in the ROM 13, instructs the CPU 11 to load the operating system 30 from the hard disk drive 16 into the RAM 14. Once the operating system 30 is loaded into RAM 14, the CPU 11 executes the operating system code and causes the visual elements associated with the user interface of the operating system 30 to be displayed on the monitor 25. When an application program 32a is opened by a user, the program code and relevant data are read from the hard drive 16 and stored in the RAM 14. Furthermore, once a first application program 32a is opened by a user, the first application program 32a may also open another application program 32b to perform some specialized task.

The operating system 30 also provides a variety of functions or services that allow an application program 32a to easily deal with various types of input/output (I/O). This allows an application program 32a to issue relatively simple function calls that cause the operating system to perform all of the steps required to accomplish various tasks. Similarly, objects communicate with both the operating system 30 and application programs 32 using relatively simple function calls and more complex interprocess communications.

The preferred embodiment of the present invention is represented by "Microsoft Publisher 95 for Windows 95", which is a desktop publishing software application marketed by Microsoft Corporation of Redmond, Wash. Briefly described, the preferred application program is a tool for creating documents, letters, newsletters, and the like by combining the presentation of text and graphics in an artful manner. The preferred application program is graphical, and takes advantage of the graphical power of the "Windows 95" and "Windows NT" operating systems. This gives the user visual access to the documents and simple, direct ways to view and manipulate document information. However, it should be understood that the invention is operating system independent and can readily be implemented for use with other operating systems, such as Microsoft Corporation's "Windows 3.1" operating system, IBM Corporation's "OS/2" operating system, and the operating system used in "MACINTOSH" computers manufactured by Apple Computer, Inc.

At this point, it should be appreciated that operating systems, such as the "Windows 95" and "Windows NT" operating system, are quite complex and provide a wide variety of services that allow users and application programs to utilize the resources available in the personal computer. Those skilled in the art will be familiar with operating systems and their various features, which include, but are in no means limited to, the specific messages and functions described above. For more comprehensive information regarding the "Windows 95" and "Windows NT" operating system and its interaction with application programs, the reader may refer to any of a variety of publications, including the "Win32 Programmer's Reference" published by Microsoft Press and "Advanced Windows" published by Microsoft Press.

Likewise, those skilled in the art will appreciate that the preferred application program, "Microsoft Publisher 95 for Windows 95" provides a wide variety of features and functions in addition to those included in the brief description presented above. For additional information regarding the "Microsoft Publisher 95 for Windows 95" application program, the reader may refer to the documentation that is distributed by Microsoft Corporation with the application program.

The Preferred System For Wrapping a Closed Polygon Around an Object

Figure 2:
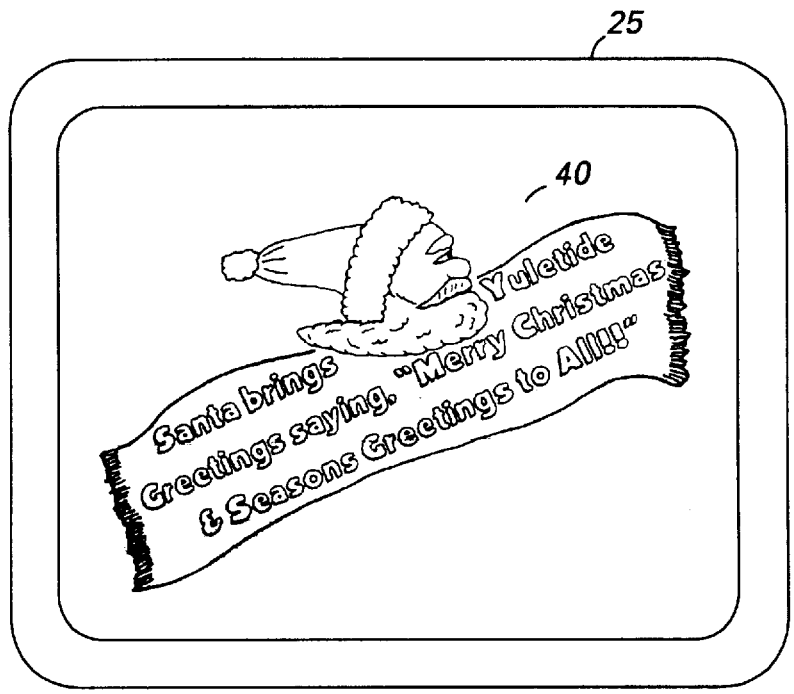
FIG. 2 is an illustration of a source image.
Figure 3:
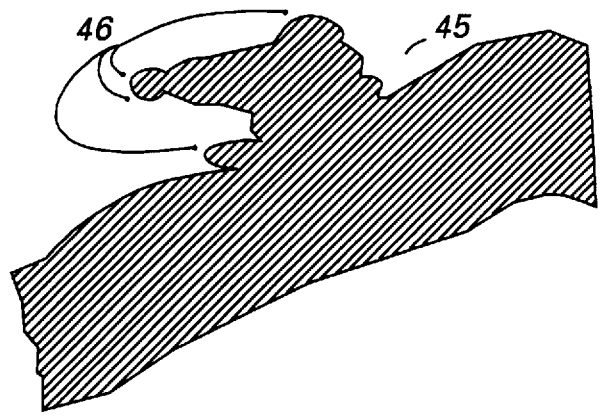
FIG. 3 is an illustration of a contour bitmap image as referenced in memory.
Figure 4:
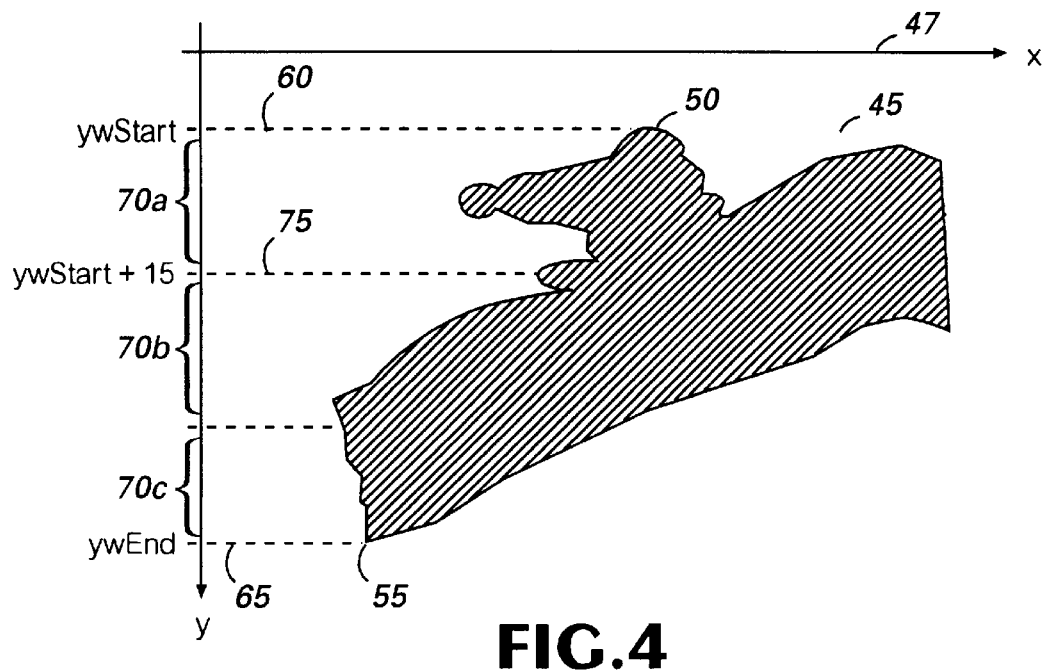
FIG. 4 is an illustration of a contour bitmap image when referenced by a specially designated coordinate system in memory.

Turning now to FIGS. 2–4, examples of objects are illustrated. FIG. 2 is an illustration of a source image 40 which has been drawn on the monitor 25. An object can be a graphic image, text, a combination of both graphics and text, or a combination of objects as long as there is a boundary defining each edge of the object. For example, a graphic cartoon with separate frames and text below the cartoon frames may be combined and referred to as a single object. Referring now to FIG. 2, the source image 40 is a representative object that can be rendered by a computer system for viewing on a pixel-based display. However, the source image 40 is not limited to the shape or size of the object shown in FIG. 2 and can be extended to other types of objects.

In the preferred operating environment of FIG. 1, the personal computer 10 is used as a publishing system to create documents. The user desires to insert the source image 40 into a document and to thereafter "wrap" text around the source image 40. The source image 40 is defined by a user as either a bitmap or a metafile stored on a file located in any memory storage device logically connected to the personal computer 10, such as ROM 13, RAM 14, the hard disk drive 16, a floppy disk 19, or a CD-ROM (not shown). Bitmaps and metafiles are collections of information that form a visual image and are well known to those skilled in the art. Bitmaps store the information in the form of a set of pixels (picture elements). Metafiles store the information in a sequence of graphic operations that is independent of the pixels used to display the image. Despite differences between the formats of stored graphic images, both bitmaps and metafiles contain information on the size of the image when it was originally created. Therefore, information on the original or preferred size of the source image 40 is part of the file containing the source image 40.

FIG. 3 is an illustration of a contour bitmap image 45 and an example series of polygon points 46. Note that this illustration is not drawn or displayed on the computer monitor 25 (FIG. 1) but is included as a reference. Referring now to FIG. 3, an example series of polygon points 46 is illustrated which help to wrap the contour bitmap image 45. These polygon points 46 are initially positioned and then adjusted to surround the contour bitmap image 45 during the process of the preferred embodiment, as will be discussed later in more detail. The contour bitmap image 45, although also a representative object, is a secondary image of lower resolution created in memory from the source image 40 (another object) to increase the efficiency of the preferred embodiment. It is less burdensome on computer processing time and computer memory to wrap a low resolution image rather than a high resolution image. Additionally, it is important to note that the contour bitmap image 45 is merely a tool created in computer memory and is never actually displayed on the computer monitor 25 (FIG. 1).

In the preferred embodiment, the resolution of the contour bitmap image 45 is 16 points for each quarter inch of the source image 40. This resolution has been determined by experimentation to provide a reasonable compromise for creating tight-fitting polygons without generating a quantity of polygon points 46 that would negatively impact computer system resources.

Furthermore, the number of polygon points 46 needed to encompass the source image 40 is reduced by using a lower resolution version of the source image 40, i.e., the contour bitmap image 45. This is advantageous in order to maintain the user's ability to manually edit the locations of the polygon points 46. Toward this end, it is desirable that the total number of polygon points encompassing the source image 40 be kept less than a predetermined threshold number. In the preferred embodiment, this threshold number has been determined by experimentation to be 160 in order to maintain the ability to edit the locations of the polygon points 46.

Additionally, in the preferred embodiment, the contour bitmap image 45 is monochrome. The amount of memory required for storing an image is directly related to the number of possible colors in the image. For example, those skilled in the art will appreciate that a 1-bit image (monochrome) will take 24 times less memory than a 24-bit image (millions of colors). In a publishing system, such as the preferred embodiment, multiple 24-bit images may appear on the monitor 25 (FIG. 1) in a given document. Therefore, the use of a monochrome contour bitmap image 45 while forming the closed polygon advantageously reduces the memory requirements while still designating which pixels within the source image 40 are set.

FIG. 4 illustrates the contour bitmap image 45 referenced by a specially designated coordinate system 47. Referring now to FIG. 4, a two-dimensional coordinate system 47 is arbitrarily defined as"w-space" merely to reflect the lower resolution of the contour bitmap image 45 (as opposed to the higher resolution of the source image 40). When referring to bitmap images, one skilled in the art will appreciate it is conventional to refer to the top left corner of the image as the origin with coordinates (0,0). Accordingly, this coordinate system 47 is oriented with positive values of the y-coordinate going down the y axis. The coordinate system 47 functions as a reference when positioning points around the contour bitmap image 45. Similar to the contour bitmap image 45, this coordinate system 47 is merely a reference tool used in the present invention and is not displayed on the computer monitor 25.

In the preferred embodiment, the top most set point 50 and the bottom most set point 55 on the contour bitmap image 45 are located on line ywStart 60 and line ywEnd 65, respectively, of the coordinate system 47. These two points define upper and lower y-coordinate boundaries of the contour bitmap image 45 in the coordinate system 47.

In the preferred embodiment, the contour bitmap image 45 is divided into a series of horizontal threshold bands 70a–c. Although these threshold bands 70a–c conceptually separate the edges of the contour bitmap image 45 into segments, the threshold bands 70a–c are merely for reference and are not actually drawn for viewing on the monitor 25 (FIG. 1). The width of the threshold bands 70a–c is determined by experimentation to optimize the number of points, the use of computer resources, and to maintain the ability to edit the points. In the preferred embodiment, each of the threshold bands 70*a–b* are one quarter inch wide with a vertical resolution of 16 points in that quarter inch width with the exception of the last threshold band 70*c*.

Within each band, horizontal lines labeled Ybandstart and Ybandstop define the top and bottom horizontal boundaries. The first threshold band 70*a* contains the top most set point 50 of the contour bitmap image 45 and begins on line ywStart 60. The first threshold band 70*a* ends on the horizontal line ywStart+15 75. Therefore, for the first threshold band 70*a*, Ybandstart is defined by line ywStart 60 and Ybandstop is defined by line ywStart+15 75.

FIGS. 5–8 illustrate the placement and adjustment of points of the polygon 80*a–d* in the first threshold band 70*a*. This process of positioning and adjusting points of the polygon 80*a–d* is illustrated and described for only the first threshold band 70*a*, but it should be appreciated that this process is repeated for each of the other threshold bands 70*b–c*.

Figure 5:
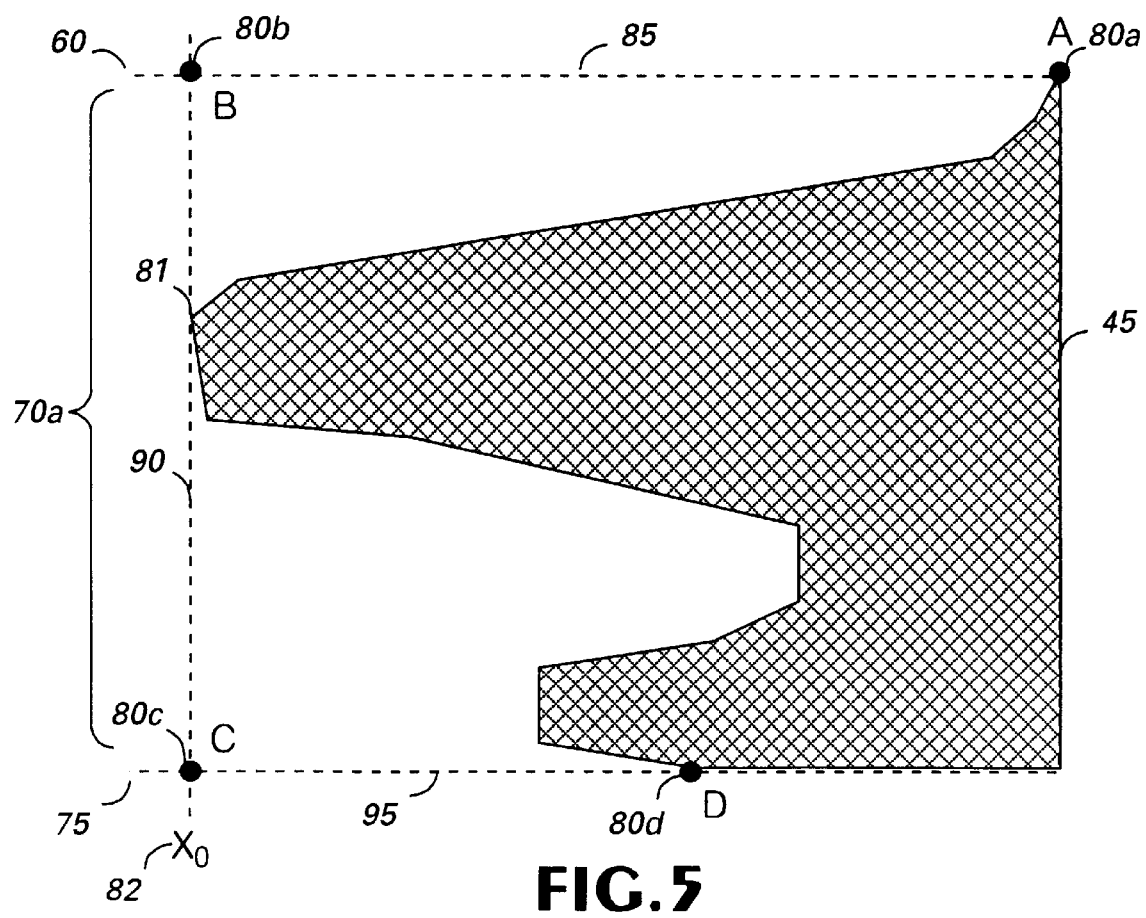
FIGS. 5–8 are illustrations of a sample threshold band of a contour bitmap image depicting placement of points around the left-side or right-side of the contour bitmap image in accordance with the present invention.

Turning first to FIG. 5, it is desirable to position the points of the polygon 80*a–d* as close to the contour bitmap image 45 as possible in order to tightly wrap the contour bitmap image 45 thereby allowing text to flow substantially adjacent to the source image 40. The points of the polygon 80*a–d* will ultimately be sequentially connected and, if they are positioned too close to the contour bitmap image 45, the contour bitmap image 45 could be clipped. Therefore, during the process of positioning the points 80*a–d* within each threshold band 70*a–c*, an adjustment of the location of the points of the polygon 80*a–d* may be needed.

A set of points is placed "substantially adjacent" to the contour bitmap image 45 when at least every third sequential point is positioned immediately proximate to the contour bitmap image 45 and the points sequentially in between the immediately proximate points are adjusted so that line segments between any sequential points are about to clip the contour bitmap image 45. In the preferred embodiment, points A 80*a* and D 80*d* are positioned immediately proximate to (one set pixel off in w-space units) the contour bitmap image 45 and are not adjusted in location. Points B 80*b* and C 80*c* are initially positioned near the contour bitmap image 45, but may be later adjusted to be substantially adjacent to the contour bitmap image 45 so that line segments between any sequential points do not intersect the contour bitmap image 45. Thus, in the preferred embodiment, the line segments cannot be closer to the source image 40 than 1/64 of an inch of the source image 40 original size due to the band size (¼ inch) and points in a band (16).

Still referring to FIG. 5, Xleast 81 is the left most set point of the contour bitmap image 45 within the threshold band 70*a*. Xleast 81 can also be called the outer most set point in reference to the point on the edge of the contour bitmap image 45 that horizontally extends the furthest away from Point A 80*a*. X0 82 is the x-coordinate of the vertical line one space left of Xleast 81. Point A 80*a* is positioned just to the left of the first point set at the top of the contour bitmap image 45 within the threshold band 70*a*. Point B 80*b* is positioned on horizontal line Ybandstart 60 with an x-coordinate of X0 82. Point C 80*c* is positioned on horizontal line Ybandstop 75 with an x-coordinate of X0 82. Point D 80*d* is positioned just to the left of the first point set at the bottom of the contour bitmap image 45.

Vectors are defined and labeled in reference to points A–D 80*a–d*. Point A 80*a* and point B 80*b* define vector AB 85. Point B 80*b* and point C 80*c* define vector BC 90. Point C 80*c* and point D 80*d* define vector CD 95. Thus, points A 80*a* and D 80*d* are positioned immediately proximate to the contour bitmap image 45 while points B 80*b* and C 80*c* are initially positioned near the contour bitmap image 45. Therefore, by definition, vectors AB 85, BC 90, and CD 95 cannot intersect or clip the contour bitmap image 45 upon initial placement of points A–D 80*a–d*.

Figure 6:
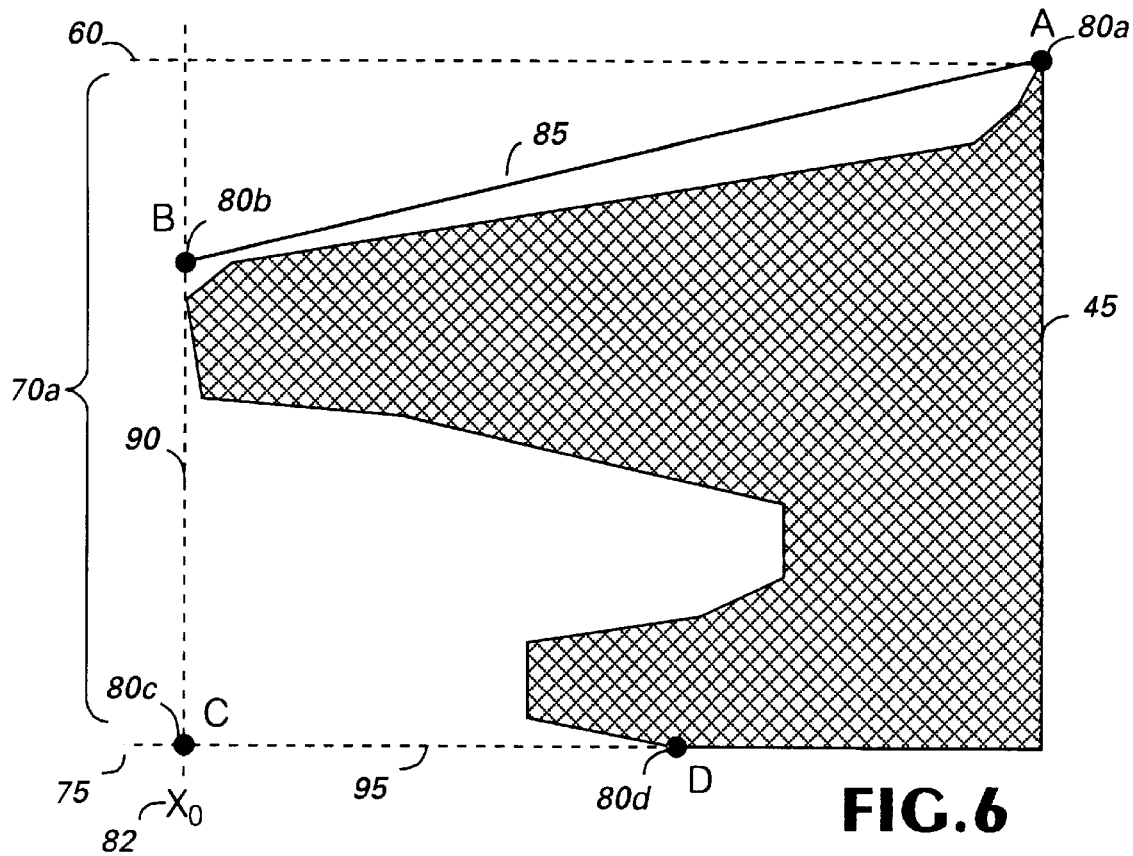
Figure 7:
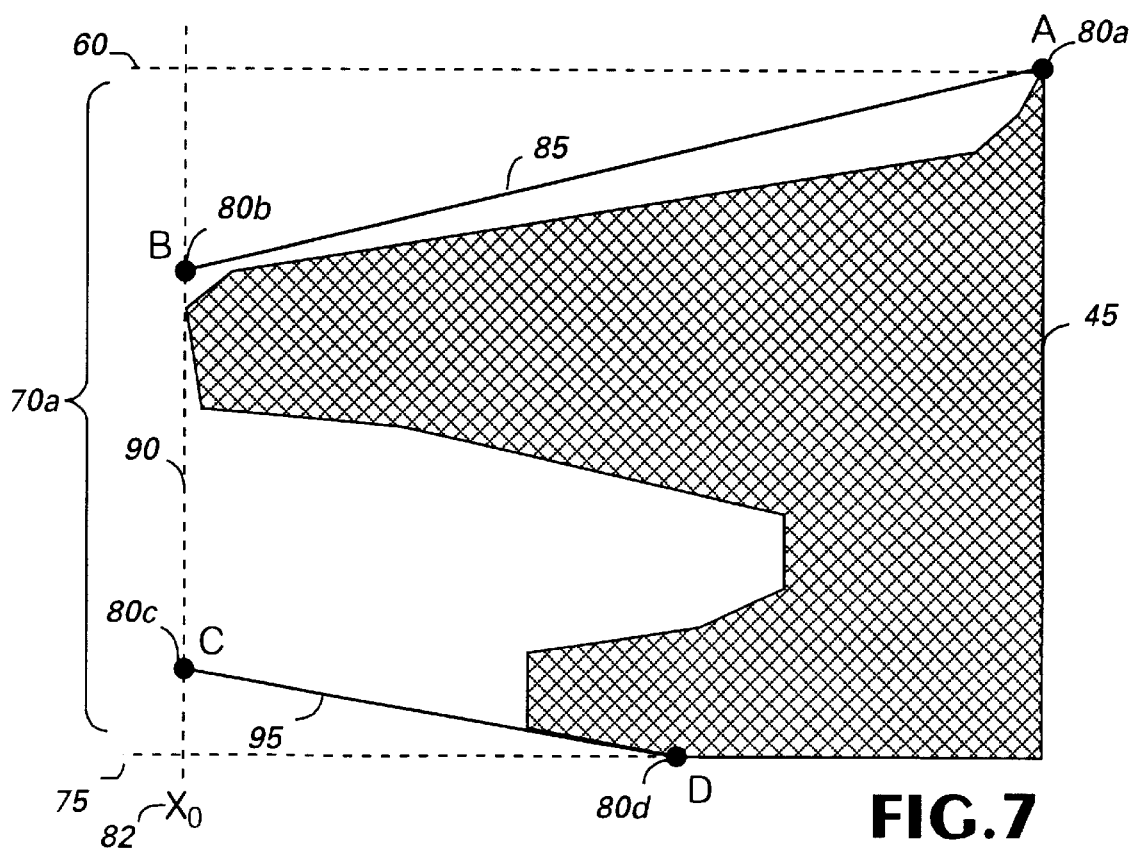

FIG. 6 and FIG. 7 show the results of moving or adjusting the location of middle points B 80*b* and C 80*c* closer to the contour bitmap image 45. This is desirable because the closer points B 80*b* and C 80*c* are to the contour bitmap image 45 without vectors AB 85, BC 90, and CD 95 intersecting or clipping the contour bitmap image 45, the closer text can flow around the source image 40. FIG. 6 illustrates the results of moving point B 80*b* down vector BC 90 toward point C 80*c* until vector AB 85 is "about to clip or intersect" the contour bitmap image 45. The determination of "about to clip or about to intersect" is performed by incrementally moving a point along a vector until clipping or an intersection occurs. Then, the point is backed up a single iteration along the same vector. Referring now to FIG. 6, point B 80*b* is moved in this manner to bring it closer in proximity to the contour bitmap image 45.

FIG. 7 illustrates the result of moving point C 80*c* up vector BC 90 toward point B 80*b* until vector CD 95 is about to clip or intersect the contour bitmap image 45. Referring now to FIG. 7, point C 80*c* has been moved or adjusted in this manner to also bring it closer in proximity to the contour bitmap image 45. Thus, points A–D 80*a–d* have effectively "shrink-wrapped" the contour bitmap image 45 in the threshold band 70*a*.

Figure 8:
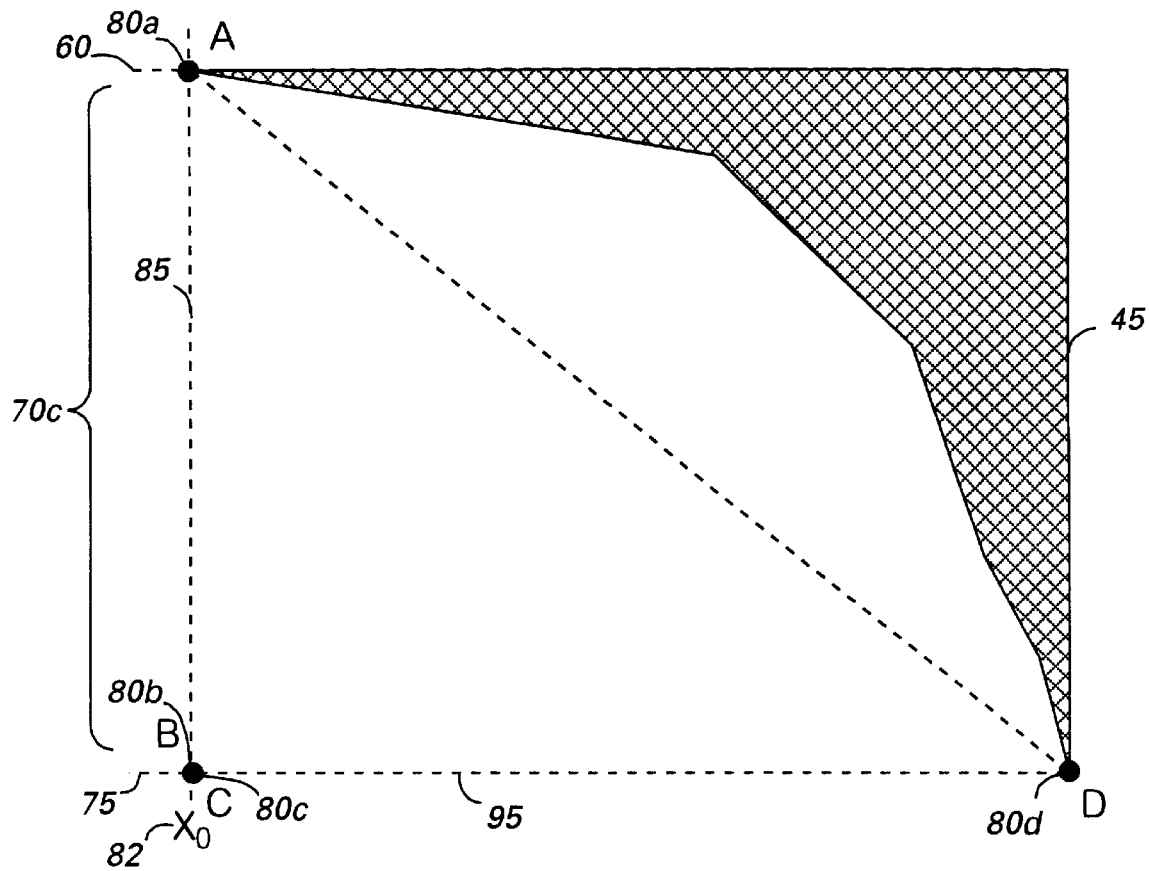

FIG. 8 illustrates a threshold band 70*c* where further adjustment may be desired. Referring now to FIG. 8, it is important to note that in general, further adjustment of the location of point B 80*b* and point C 80*c* toward the contour bitmap image 45 would force one of the three vectors 85–95 to clip or intersect the contour bitmap image 45. However, there is a relatively uncommon or degenerate case where further movement of both point B 80*b* and point C 80*c* along vector AB 85 and vector CD 95, respectively, would not force one of the three vectors 85–95 to clip or intersect the contour bitmap image 45. This condition occurs, as illustrated in FIG. 8, when the left most set point of the contour bitmap image 45 within the threshold band 70*c* is on line Ybandstart 60.

When this condition does occur, it is desirable to move point B 80*b* and point C 80*c* closer to the contour bitmap image 45. Point B 80*b* is moved toward point A 80*a* on vector AB 85 and point C 80*c* is moved toward point D 80*d* on vector CD 95 until vector BC 90 is about to clip or intersect the contour bitmap image 45. In the example illustrated in FIG. 8, this adjustment would result in the placement of points B 80*b* and C 80*c* on points A 80*a* and D 80*d*, respectively. Duplicate points could be eliminated, thereby reducing the overall number of points and conserving computer resources. The non-duplicated points A–C 80*a–c* are added to a list of points for the left-side of the contour bitmap image 45. Point D 80*d* is never added to the list of points because, by convention, point D 80*d* becomes point A 80*a* for the next threshold band. The preferred method illustrated with respect to FIGS. 5–8 is repeated for each threshold band on the left-side of the contour bitmap image 45.

Figure 9:
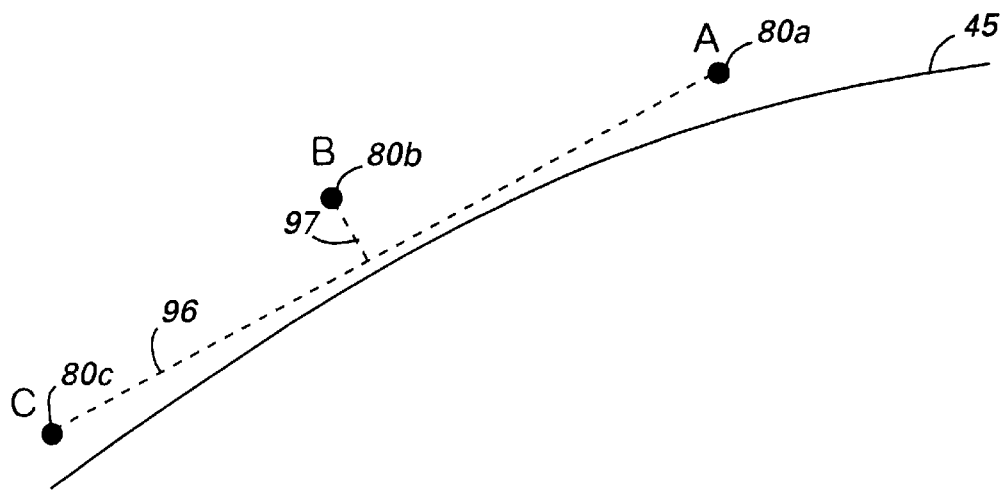
FIG. 9 is an illustration of three consecutive points that are substantially collinear.

FIG. 9 generally illustrates a group of three substantially collinear points from the list of points from the left-side of the contour bitmap image 45. In order to maintain a manageable number of points of the polygon, it is desirable to eliminate the center point of any three substantially collinear points. The center point may be eliminated provided that a line segment between the remaining two points does not clip or intersect the contour bitmap image 45.

Referring now to FIG. 9, points A 80*a*, B 80*b*, and C 80*c* are a group of three points from the list of points compiled for the left-side of the contour bitmap image 45. These three points 80*a–c* are under consideration to determine if they are substantially collinear. Vector AC 96 is defined by point A 80*a* and point C 80*c*. The shortest distance from point B 80*b* to vector AC 96 is calculated and labeled as the offset distance 97. If this offset distance 97 is less than a threshold offset, point B 80*b* is considered to be substantially collinear with points A 80*a* and C 80*c*. Point B 80*b* can be eliminated if vector AC 96 does not intersect the contour bitmap image 45. In the preferred embodiment, the threshold offset is determined to be ¹/₂₀ of the distance between points A and C. This threshold offset has been determined by experimentation for efficient operation of the preferred embodiment.

In the preferred embodiment, a reduction of points, illustrated by FIG. 9 and described above, is first performed after compiling the list of points for the left-side of the contour bitmap image 45. Then, the process described above with results illustrated in FIGS. 5–8 is repeated for the right-side of the contour bitmap image 45, starting from the bottom of the contour bitmap image 45 and exchanging orientations of "right" for "left", "top" for "bottom", and "up" for "down." As a result, a list of points for the right-side of the contour bitmap image 45 is compiled. The reduction of substantially collinear points, as illustrated in FIG. 9 and described above, is repeated for the combined list of remaining left-side and right-side points.

Figure 10:
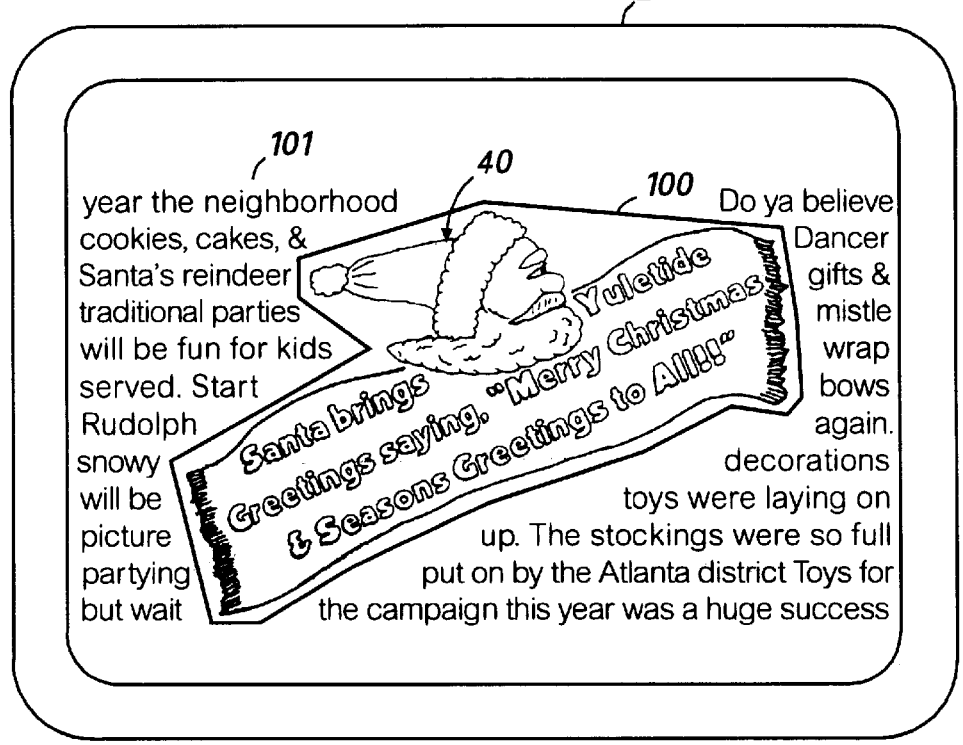
FIG. 10 is an illustration of a source image encompassed by a non-intersecting closed polygon with text flowing around the source image.

FIG. 10 illustrates the source image 40 after it has been wrapped by a closed polygon 100 and with text 101 flowing around the source image 40. The closed polygon 100 wraps but does not intersect the source image 40. The closed polygon 100 is created from the combined list of remaining points positioned in each threshold band 70*a–d* from both the left-side and right-side of the contour bitmap image 45. After the closed polygon 100 has been generated, the source image 40 is displayed and text 101 is flowed around the source image 40. Those skilled in the art are familiar with conventional techniques for directing application programs and program modules to flow text 101 around a closed polygon 100. It is important to note that although the closed polygon 100 is typically not drawn on the monitor 25 (FIG. 1), the closed polygon 100 is drawn on the monitor 25 in FIG. 10 for reference purposes only.

In summary, a closed polygon 100 is generated to tightly encompass or "shrink wrap" the source image 40 without clipping or intersecting the source image 40. A contour bitmap image 45 with threshold bands 70*a–c* is created in memory representing the higher resolution source image 40. Points 80*a–d* are sequentially positioned within each threshold band 70*a–c* encompassing the contour bitmap image 45 and are substantially adjacent to the contour bitmap image 45. This process is repeated down the left-side and then up the right-side of the contour bitmap image 45 within each of the threshold bands 70*a–c*. Thus, a set of points are positioned and adjusted to form a closed polygon 100 that does not intersect the contour bitmap image 45 or the source image 40.

Figure 11:
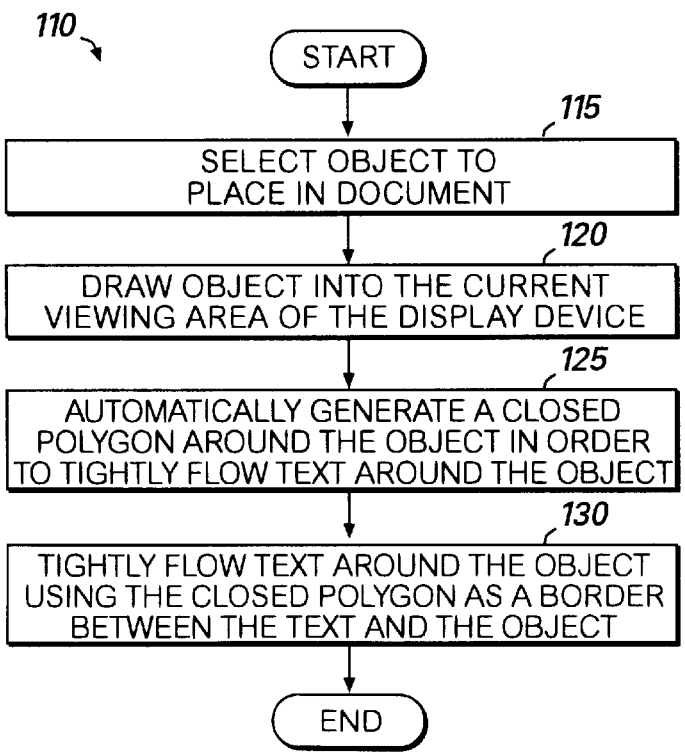
FIG. 11 is a simplified logical flow diagram illustrating the primary steps completed by a computer-implemented process embodying the present invention.

FIG. 11 is a simplified logical flow diagram illustrating the primary steps completed by a computer-implemented process embodying the present invention. Referring now to FIG. 11, a method 110 implementing the preferred embodiment begins at step 115 where an object is selected to be placed in a document. Those skilled in the art will appreciate that the object may be stored in a variety of formats, including but not limited to bitmap and metafile. At step 120, the object is automatically imported and displayed in the current viewing area of the computer monitor or other display device.

At step 125, the application program or program module automatically generates a closed polygon around the object in order to tightly flow text around the object. As previously mentioned, in other attempts at solving the present problem, it may be possible at this point to view clipping of the object by the closed polygon. However, in the preferred embodiment all clipping of the object has been avoided.

Thus, at step 130, text can be tightly flowed around the object using the tightly wrapped closed polygon as a border between the object and the text. Those skilled in the art are familiar with the conventional method of wrapping text around a closed polygon that encompasses an object.

Figure 12:
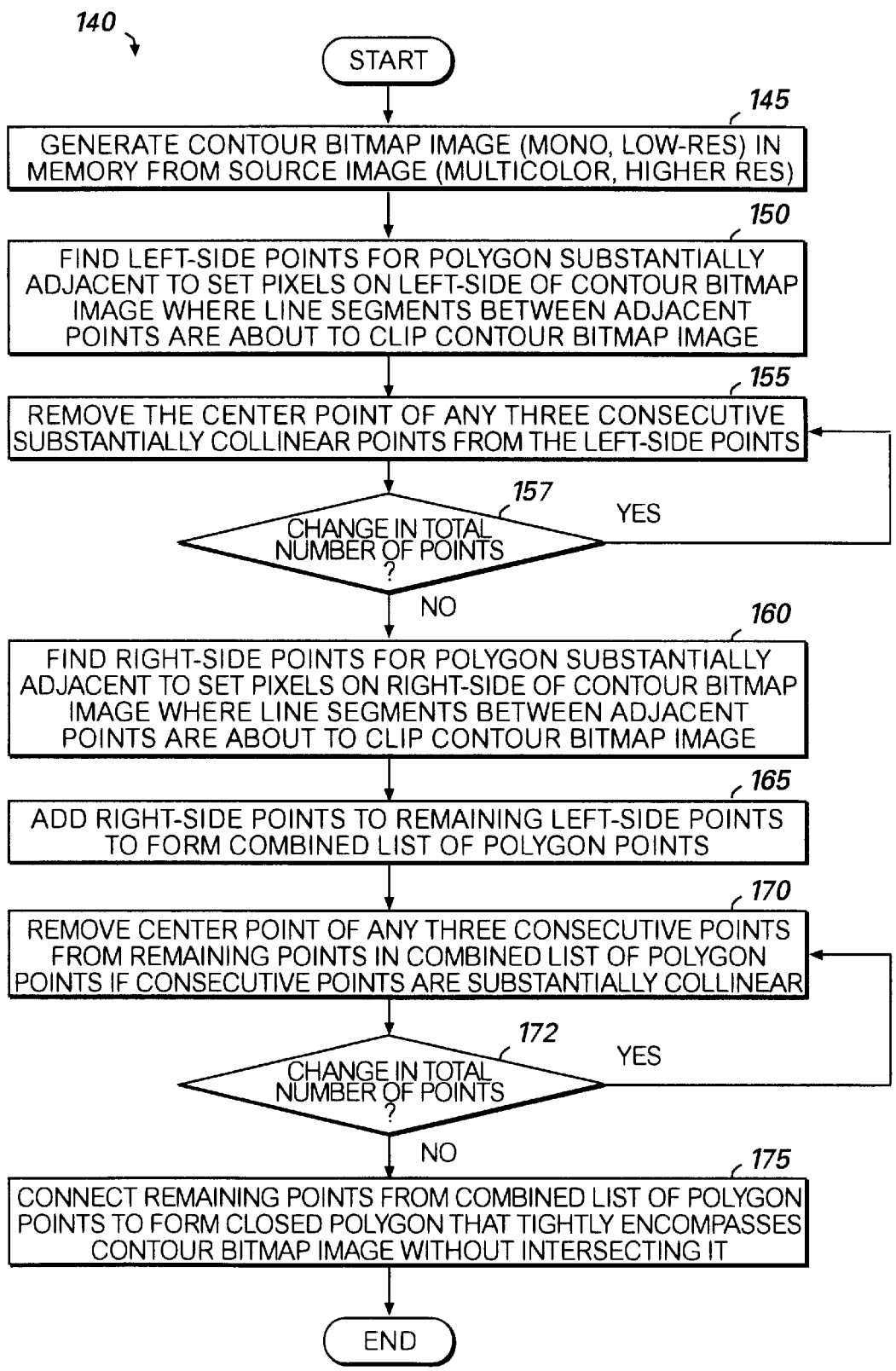
FIG. 12 is a flow diagram illustrating the method of the present invention.

FIG. 12 is a flow diagram illustrating a method 140 of the present invention. Referring now to FIG. 12 at step 145, a contour bitmap image is generated in memory from a source image. As previously mentioned, the source image can be multichromatic and can be stored in either a bitmap or metafile. The created contour bitmap image is a monochrome image of lower resolution than the source image utilized only in memory (not displayed) to efficiently create a closed polygon encompassing the source image. This contour bitmap image has both left and right sides.

At step 150, a set of left-side points for a wrapped polygon are positioned substantially adjacent to set pixels on the left-side of the contour bitmap image. These points are positioned off the contour bitmap image and such that line segments drawn between adjacent points are about to clip the contour bitmap image.

At step 155, the set of left-side points is reduced for substantially collinear points. The center point of any three substantially collinear points in the set of left-side points is removed from the set provided that a line segment between the remaining two points does not clip the contour bitmap image.

At step 157, the activity of step 155 is repeated until there is no change in the number of points in the set of left-side points.

At step 160, a set of right-side points for a wrapped polygon are positioned substantially adjacent to set pixels on the right-side of the contour bitmap image. This step is nearly identical to step 150 but is done on the right-side of the contour bitmap image instead of the left-side.

At step 165, the right-side points are combined with the remaining left-side points to form a combined list of polygon points. This list contains a sequential listing of positioned points adjacent to the entire perimeter of the contour bitmap image. The combined list of polygon points is reduced for substantially collinear points in step 170, similar to step 155.

In step 172, step 170 is repeated until there is no change in the number of points in the combined list of polygon points, similar to step 157.

Finally, at step 175, the combined list of remaining polygon points is connected to form a closed polygon that tightly encompasses the contour bitmap image without intersecting it.

FIGS. 13A–13K, collectively described as FIG. 13, are flow diagrams of a method 180 of the present invention.

Figure 13A:
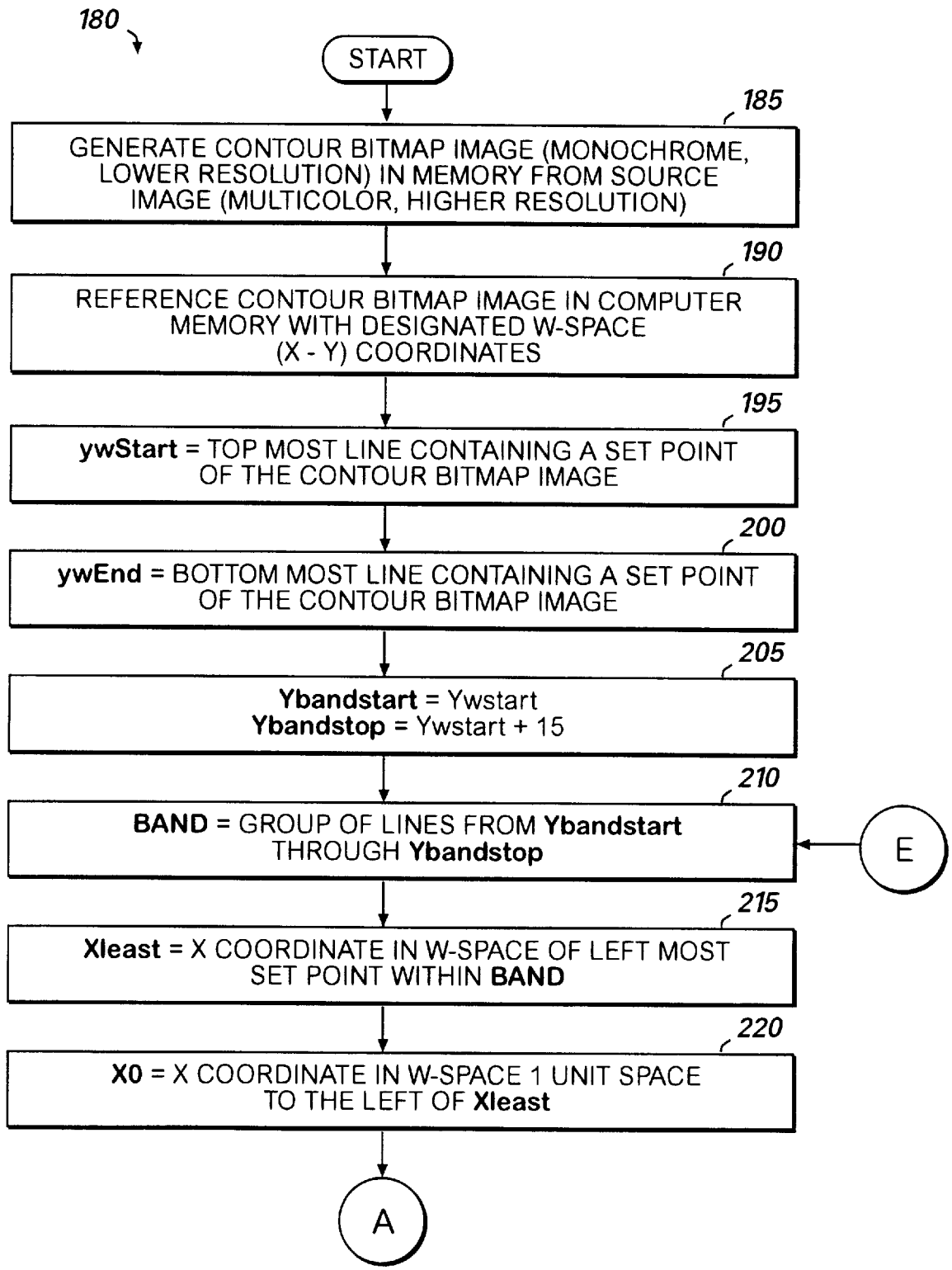

Referring now to FIG. 13A, a contour bitmap image is generated from a higher resolution source image in step 185. This step is identical to step 145 from the earlier method 140.

At step 190, the contour bitmap image is referenced in memory with a specially designated two-dimensional coordinate system. This coordinate system is defined as "w-space" in memory and reflects the predetermined resolution of the contour bitmap image settings. As previously mentioned, the resolution of the contour bitmap image and thus the "w-space" coordinate system are empirically determined by experimentation. In the preferred embodiment, this resolution is 16 points per quarter inch of the original size of the source image.

At step 195, ywStart is defined to be the horizontal line (y-coordinate) containing the top most set point of the contour bitmap image. At step 200, ywEnd is defined to be the horizontal line (y-coordinate) containing the bottom most set point of the contour bitmap image. These two lines define the upper and lower boundaries of the entire contour bitmap image.

As previously mentioned, the contour bitmap image can be conceptually divided into a series of horizontal threshold bands. At step 205, pointers to the limits of the current threshold band are defined. Ybandstart is a pointer to the top horizontal line within a threshold band and begins with the y-coordinate of line ywStart. Ybandstop is a pointer to the bottom horizontal line within a given threshold band and begins with a value of 15 more than the y-coordinate of line ywStart. Next, BAND is defined in step 210 as the current threshold band containing lines from Ybandstart through Ybandstop.

At step 215, Xleast is defined as the x-coordinate of the left most set point of the contour bitmap image within the current threshold band. At step 220, X0 is defined as the x-coordinate that is one space to the left of Xleast. Thus, any point with x-coordinate of Xleast would be positioned off the contour bitmap image.

Figure 13B:
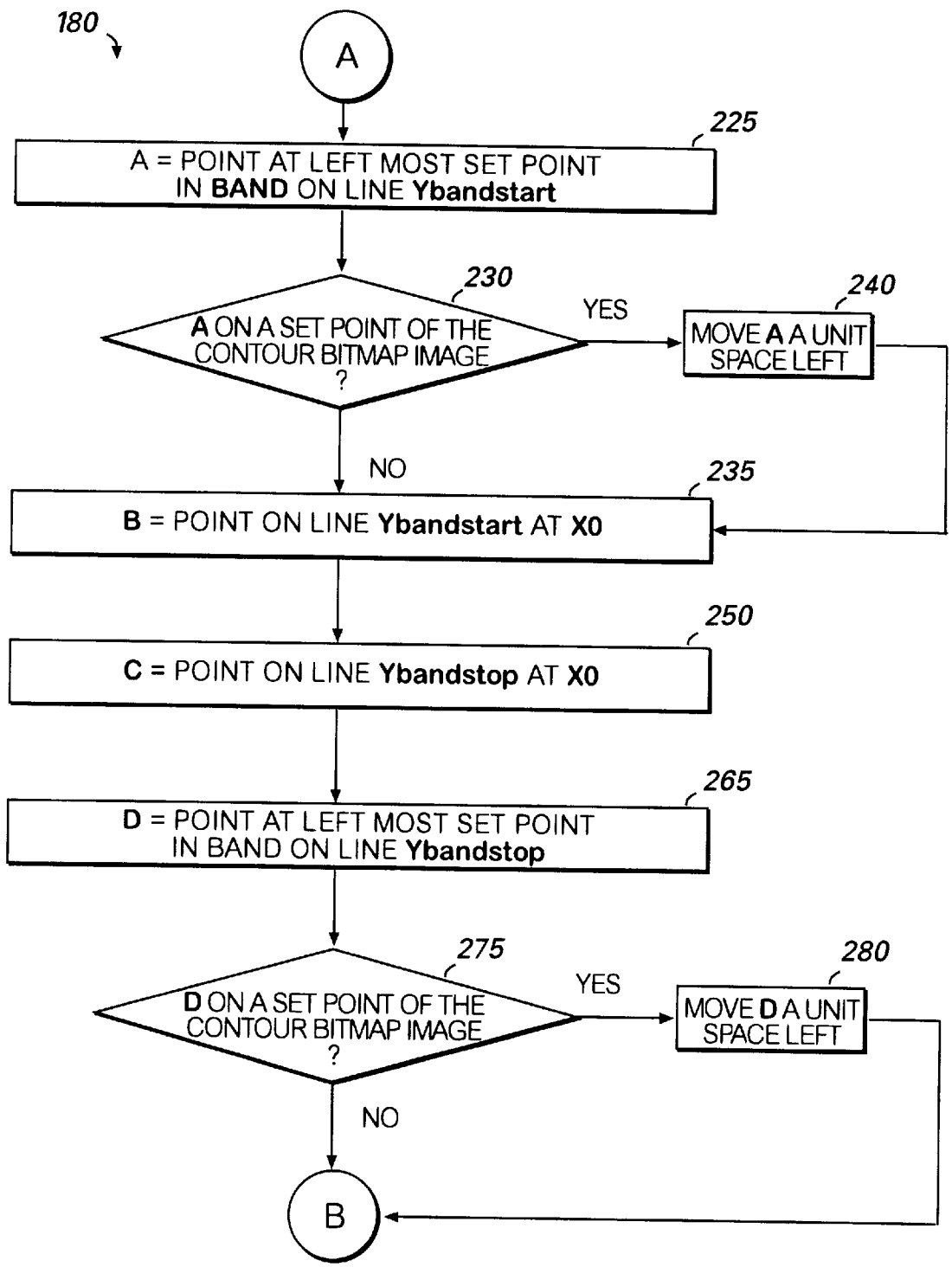

Referring now to FIG. 13B, points A–D are positioned within the current threshold band corresponding to the illustration in FIG. 5. At step 225, point A is positioned at the left most set point of the contour bitmap image on the top horizontal line, Ybandstart, within the current threshold band. At step 230, if point A is not on a set point of the contour bitmap image, proceed to step 235. If point A is on a set point of the contour bitmap image, then step 240 moves point A one space to the left off the contour bitmap image before proceeding to step 235.

At step 235, point B is positioned at x-coordinate X0 on the top horizontal line, Ybandstart, within the current threshold band. This positions point B one space to the left off the contour bitmap image before proceeding to step 250.

At step 250, point C is positioned at x-coordinate X0 on the bottom horizontal line, Ybandstop, within the current threshold band. This positions point C one space to the left off the contour bitmap image before proceeding to step 265.

At step 265, point D is positioned at the left most set point of the contour bitmap image on the bottom horizontal line, Ybandstop, within the current threshold band. At step 275, if point D is not on a set point of the contour bitmap image, then proceed to step 280. If point D is on a set point of the contour bitmap image, then step 285 moves point D one space to the left off the contour bitmap image before proceeding to step 280.

Figure 13C:
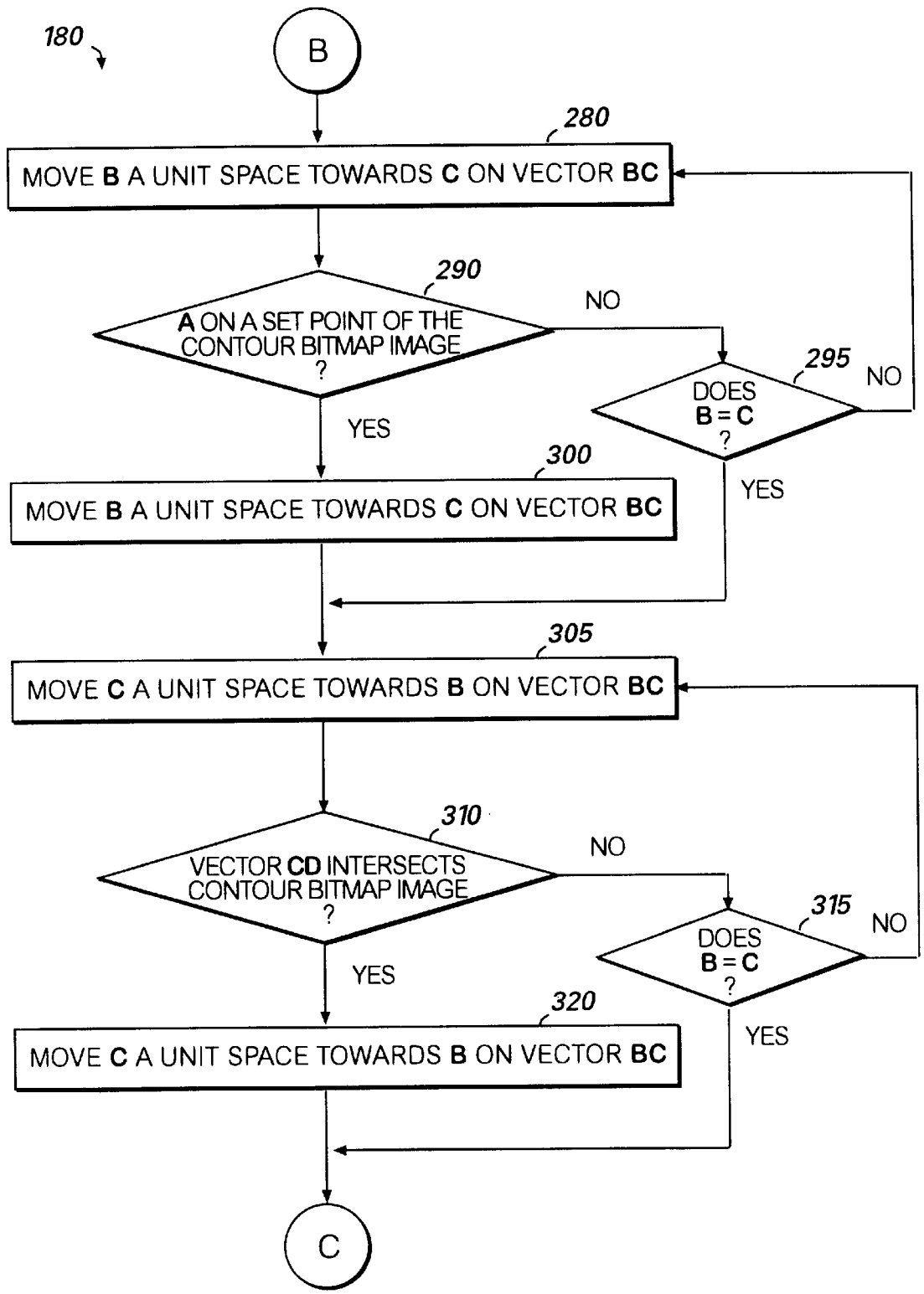

In FIG. 13C, while points A and D remain stationary, the position of points B and C are adjusted to bring them closer in proximity to the contour bitmap image corresponding to the illustrations in FIG. 6 and FIG. 7. Referring now to FIG. 13C at step 280, point B is moved towards point C along vector BC. Step 280 is incrementally repeated if, according to step 290, vector AB does not intersect the contour bitmap image and, according to step 295, point B is not positioned at the same coordinates as point C.

In the preferred embodiment, a vector is shown on the display device as a line made up by a series of pixels (picture elements). Determining if a vector intersects the contour bitmap image is implemented in the preferred embodiment by calling the LINEDDA (digital differential analyzer) function. This function is a standard Microsoft Windows API (application programming interface) function provided by the "Windows 95" and "Windows NT" operating system and is well know to those skilled in the art. In general terms, the LINEDDA function determines the discrete set of pixels that make up any line segment defined by two end points in order to draw the line segment. As applied to the preferred embodiment, when a vector is positioned close enough to the contour bitmap image to intersect the image, one of the set pixels making up the vector is the same as one of the set pixels making up the contour bitmap image. As a result, the preferred embodiment can determine if a line segment between the two points would clip the contour bitmap image. More information regarding the LINEDDA function can be obtained by referring to the "Microsoft Win32 Programmer's Reference" published by Microsoft Press.

Returning to FIG. 13C at step 290, if vector AB does intersect the contour bitmap image, then proceed to step 300. At step 300, point B is moved a unit space away from point C along vector BC before proceeding to step 305. By backing away a space, the vector is ensured to not clip the contour bitmap image while bringing the points in close proximity to the contour bitmap image.

However, in step 295, if vector AB does not intersect the contour bitmap image but point B is positioned at the same location as point C, halt adjustment of point B and proceed directly to step 305.

At step 305, point C is moved towards point B along vector BC. Step 305 is incrementally repeated if, according to step 310, vector CD does not intersect the contour bitmap image and, according to step 315, point C is not positioned at the same coordinates as point B. At step 310, if vector CD does intersect the contour bitmap image, then proceed to step 320. At step 320, point C is moved a unit space away from point B along vector BC before proceeding to step 325 on FIG. 13D. However, in step 315, if vector CD does not intersect the contour bitmap image but point C is positioned at the same location as point B, halt adjustment of point C and proceed directly to step 325 on FIG. 13D.

Figure 13D:
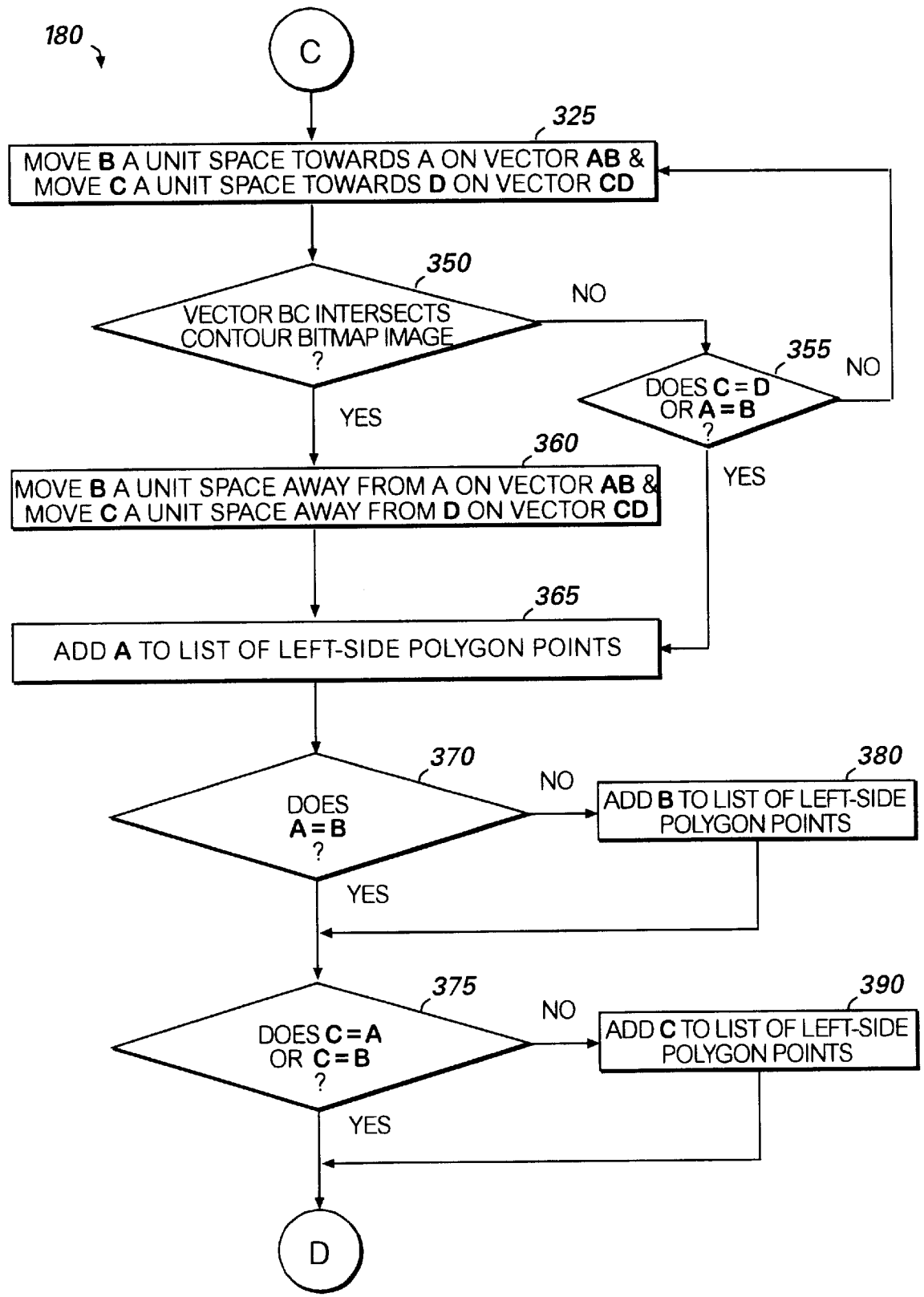

Turning now to FIG. 13D at step 325, point B is moved towards point A along vector AB and point C is moved a unit space towards point D along vector CD. Step 325 is incrementally repeated if, according to step 350, vector BC does not intersect the contour bitmap image and, according to step 355, point B is not positioned at the same coordinates as point A or point C is not positioned at the same coordinates as point D. At step 350, if vector BC does intersect the contour bitmap image, then proceed to step 360. At step 340, point B is moved a unit space away from point A along vector AB and point C is moved a unit space away from point D along vector CD before proceeding to step 365. However, in step 355, if point B is positioned at the same location as point A or point C is positioned at the same location as point D, halt adjustment of points B and C and proceed directly to step 365.

The non-duplicate positioned points from the current threshold band are then added to a list of left-side polygon points. At step 365, point A is added to the list of left-side polygon points. At step 370, if point A is positioned at the same coordinates as point B, then proceed directly to step 375. Otherwise, point B is added to the list of left-side polygon points in step 380 before proceeding to step 375. At step 375, if point C is positioned at the same coordinates as either point A or point B, then proceed directly to step 385 on FIG. 13E. Otherwise, point C is also added to the list of left-side polygon points in step 390 before proceeding to step 385 on FIG. 13E. Point D is not added to the list because, by convention, it becomes point A in the next threshold band.

Figure 13E:
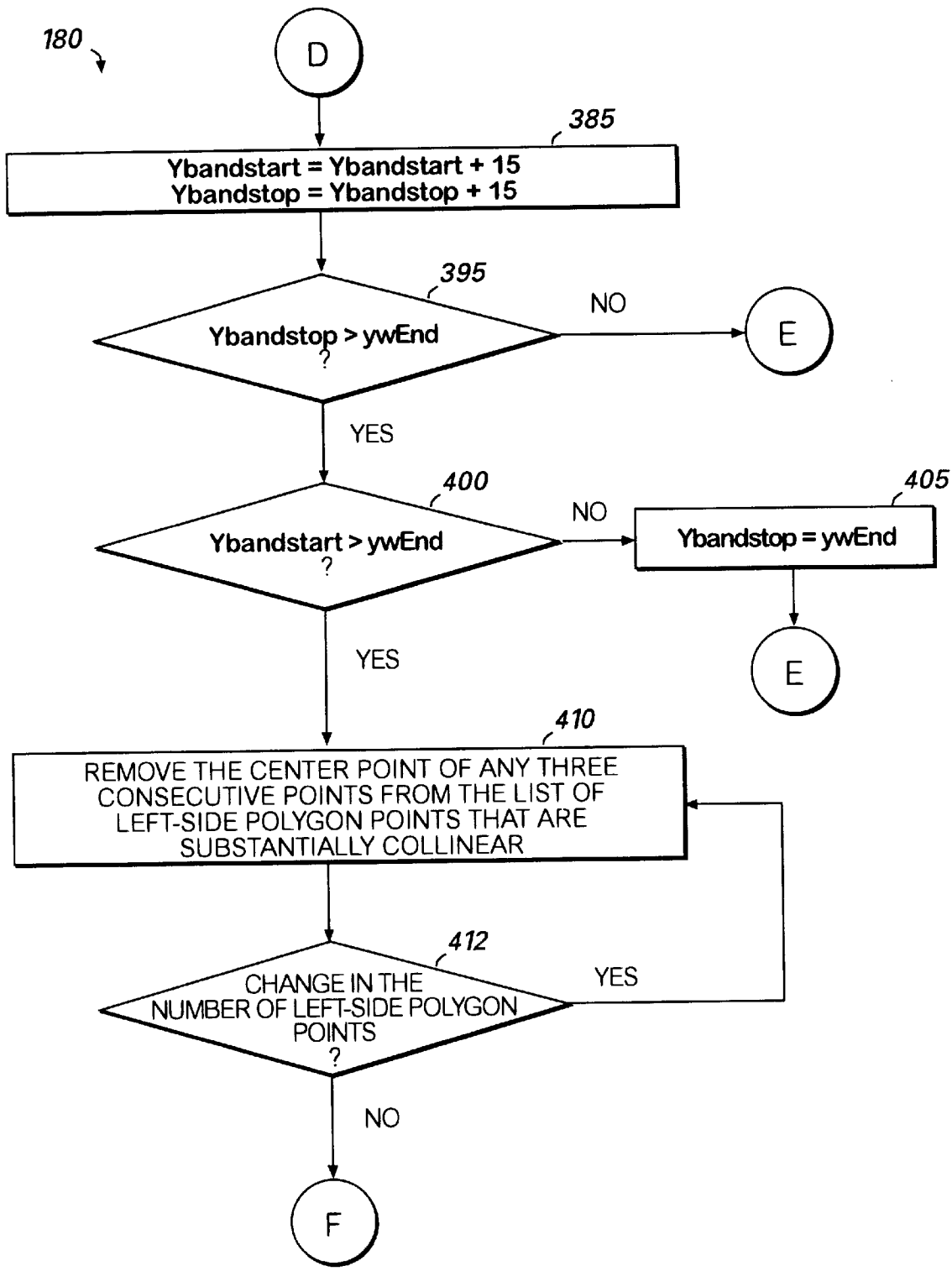
Figure 13F:
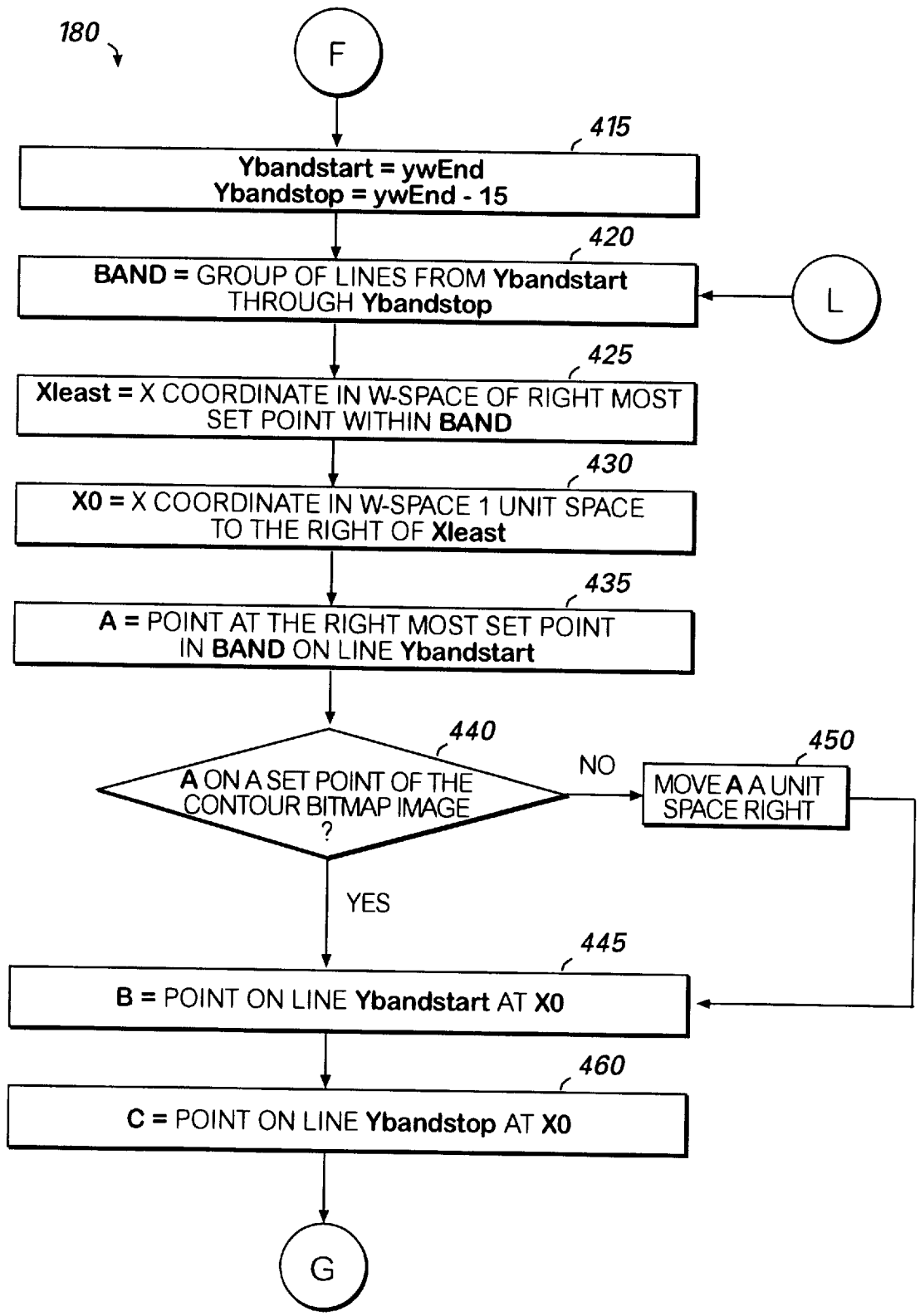
Figure 13G:
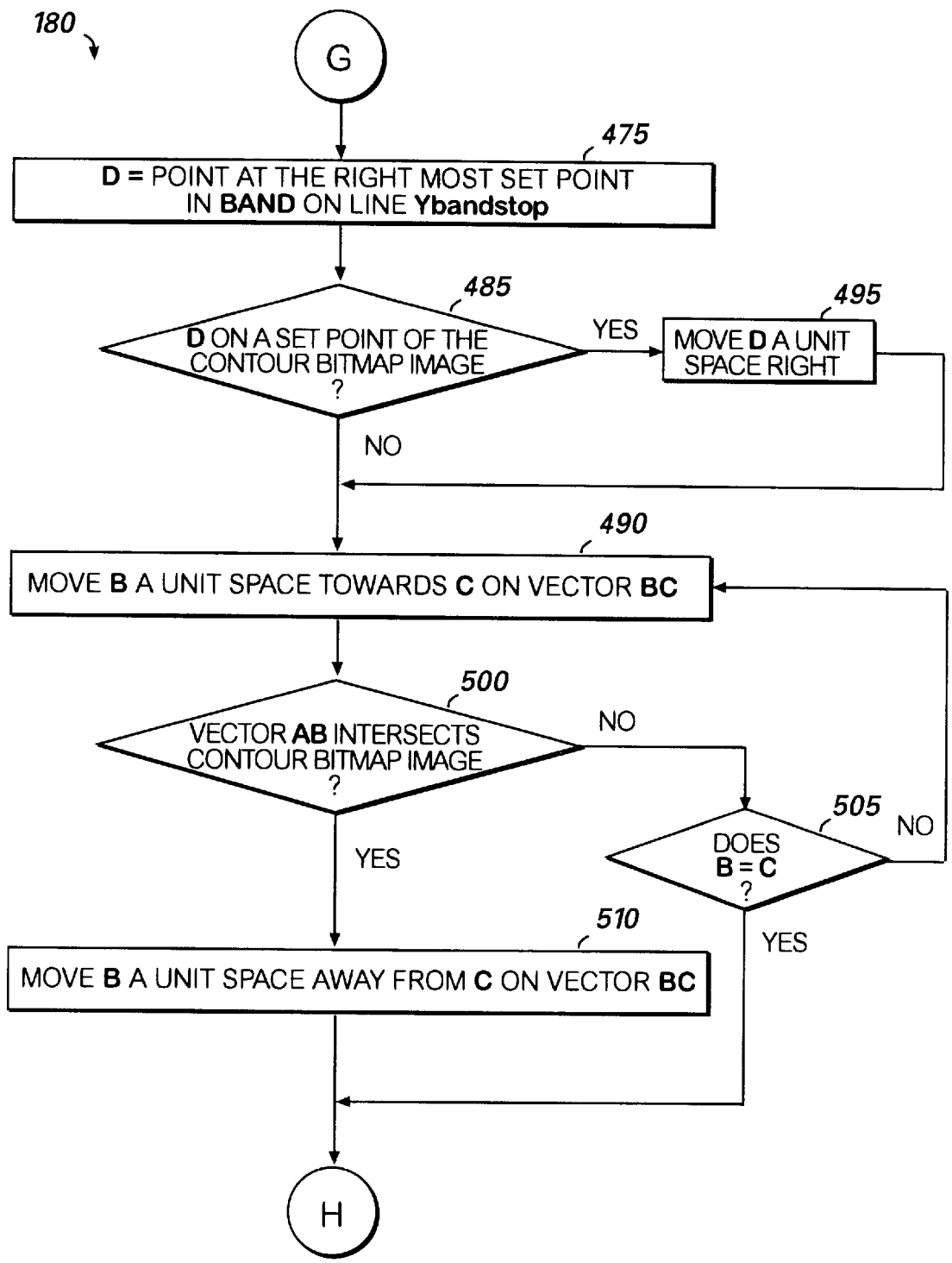
Figure 13H:
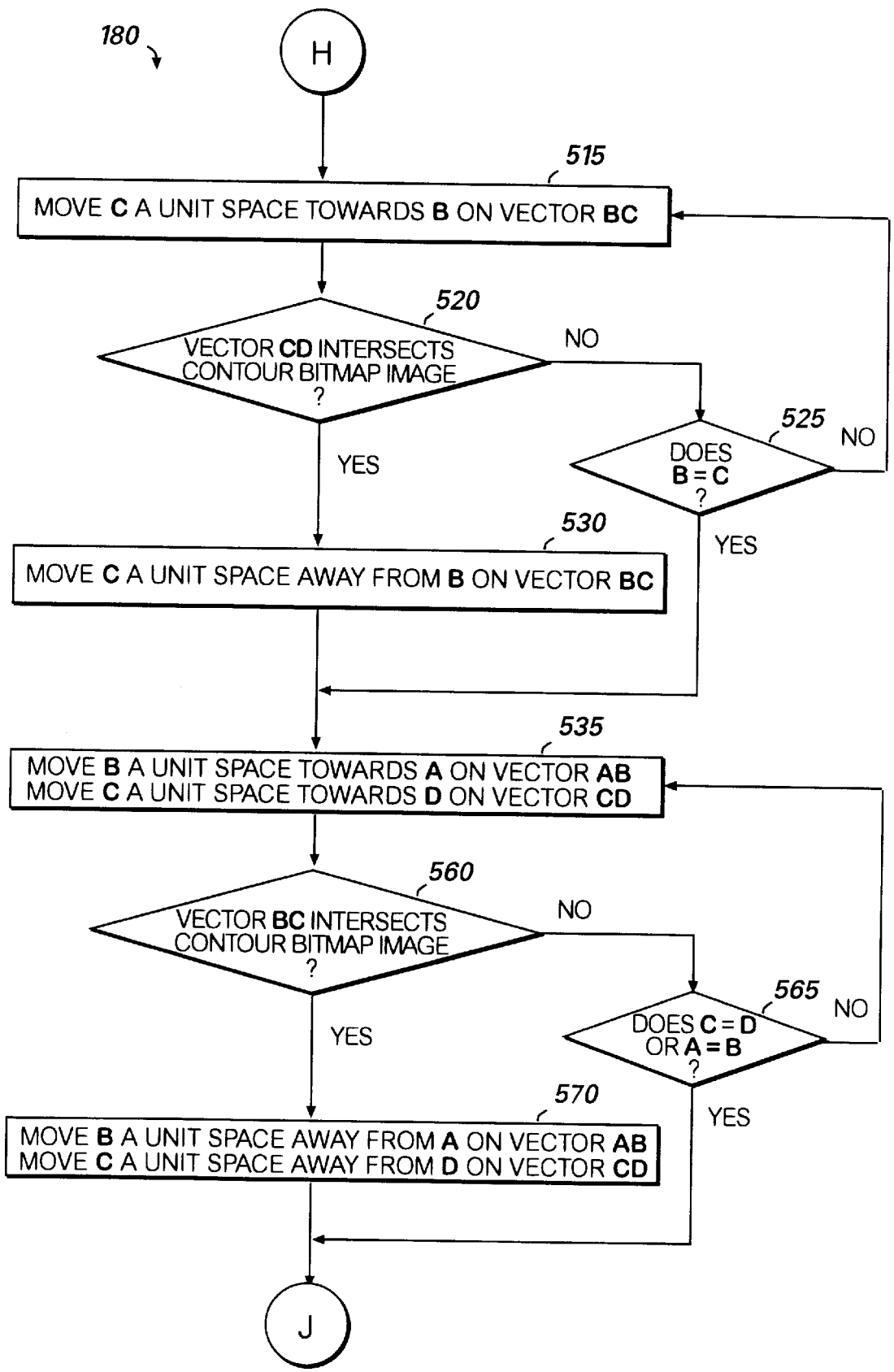
Figure 13J:
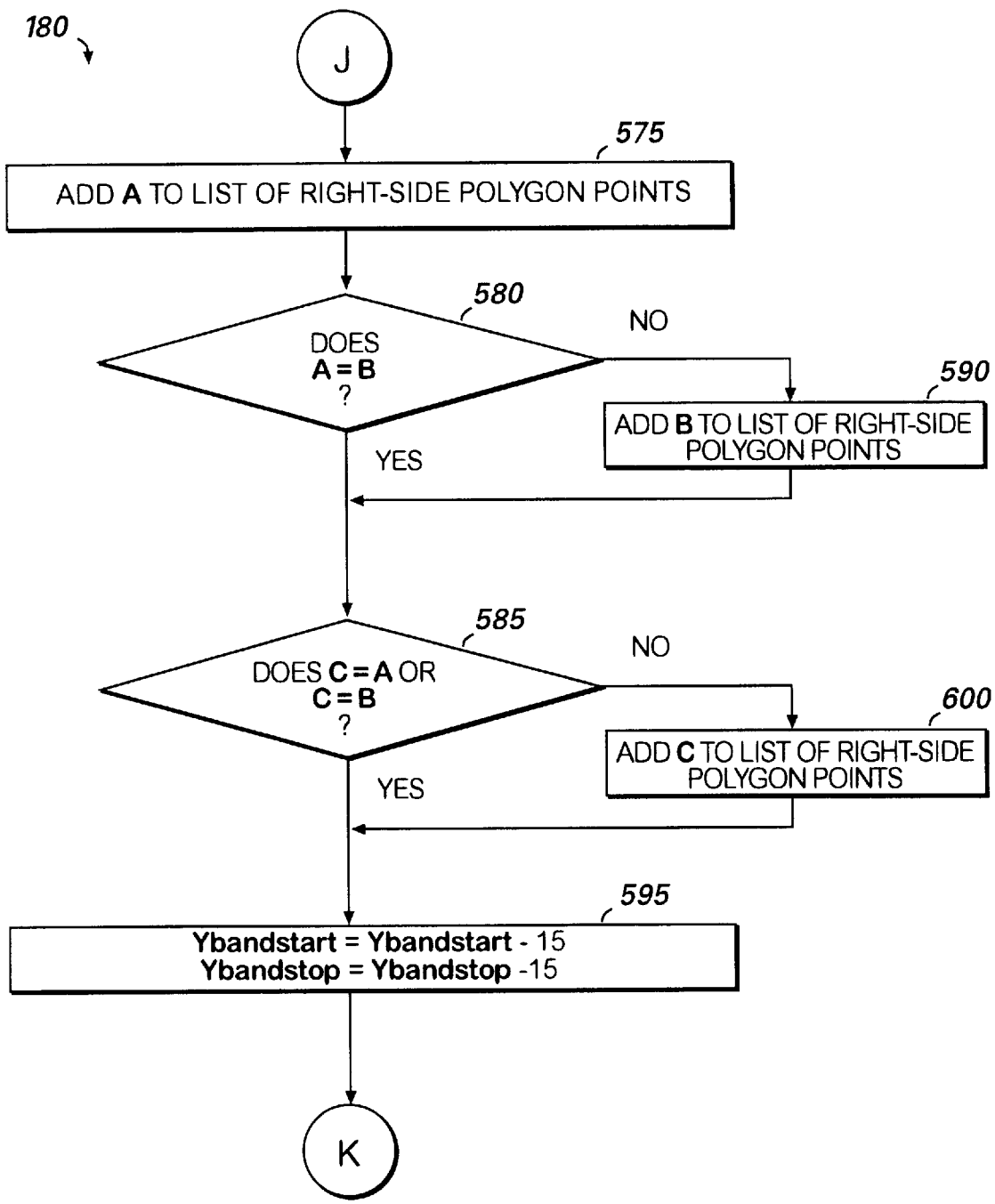

Referring now to FIG. 13E at step 385, the pointers or labels representing the horizontal line boundaries of the current threshold band are redefined for the next threshold band in the context of the w-space coordinate system referenced in FIG. 4. Ybandstart, the top of the current threshold band, is redefined as 15 w-space units more than the current Ybandstart. Ybandstop, the bottom of the current threshold band, is redefined as 15 w-space units more than the current Ybandstop.

In steps 395–405, the width of the last threshold band is determined given the likelihood that the last threshold band will not be as wide as the other threshold bands. At step 395, if the bottom of the next threshold band (Ybandstop) is not greater than the bottom line of the contour bitmap image (ywEnd), then proceed back to step 210 to repeat positioning, adjusting, and adding of left-side polygon points within the next threshold band. Otherwise, if the bottom of the next threshold band (Ybandstop) is greater than the bottom line of the contour bitmap image (ywEnd), proceed to step 400.

At step 400, if the top of the next threshold band (Ybandstart) is not less than the bottom line of the contour bitmap image (ywEnd), proceed to step 405. Otherwise, proceed to step 410.

At step 405, the bottom of the current threshold band (Ybandstop) is changed to coincide with the bottom line of the contour bitmap image (ywEnd). This happens only for the last threshold band at the bottom of the contour bitmap image. After step 405, proceed back to step 210 to repeat positioning, adjusting, and adding of left-side polygon points within the bottom threshold band.

At step 410, the center point of any three substantially collinear points in the list of left-side polygon points is removed from the list of left-side polygon points as illustrated in FIG. 9. In step 412, step 410 is repeated until there is no change in the number of points in the list of left-side polygon points. After this step, the list of left-side polygon points is generated and consideration is then turned to the right-side of the contour bitmap image.

In steps 415 through 615, many of the steps regarding the left-side polygon points are repeated with only minimal changes in order to position, adjust, and place points on the right-side of the contour bitmap image starting at the bottom and working to the top. At step 415, Ybandstart is redefined to be the y-coordinate of line ywEnd. Ybandstop is redefined to be 15 less than the y-coordinate of line ywEnd as referenced in FIG. 4. It is readily apparent that steps 420 through 615 on FIGS. 13F–13K are essentially the same as steps 210 through 405, respectively, with the exception that references to "left" are exchanged with "right", references to "top" are exchanged with "bottom", and references to "up" are exchanged with "down." Thus, steps 420 through 615 on FIGS. 13F–13K generate a list of right-side polygon points.

Figure 13K:
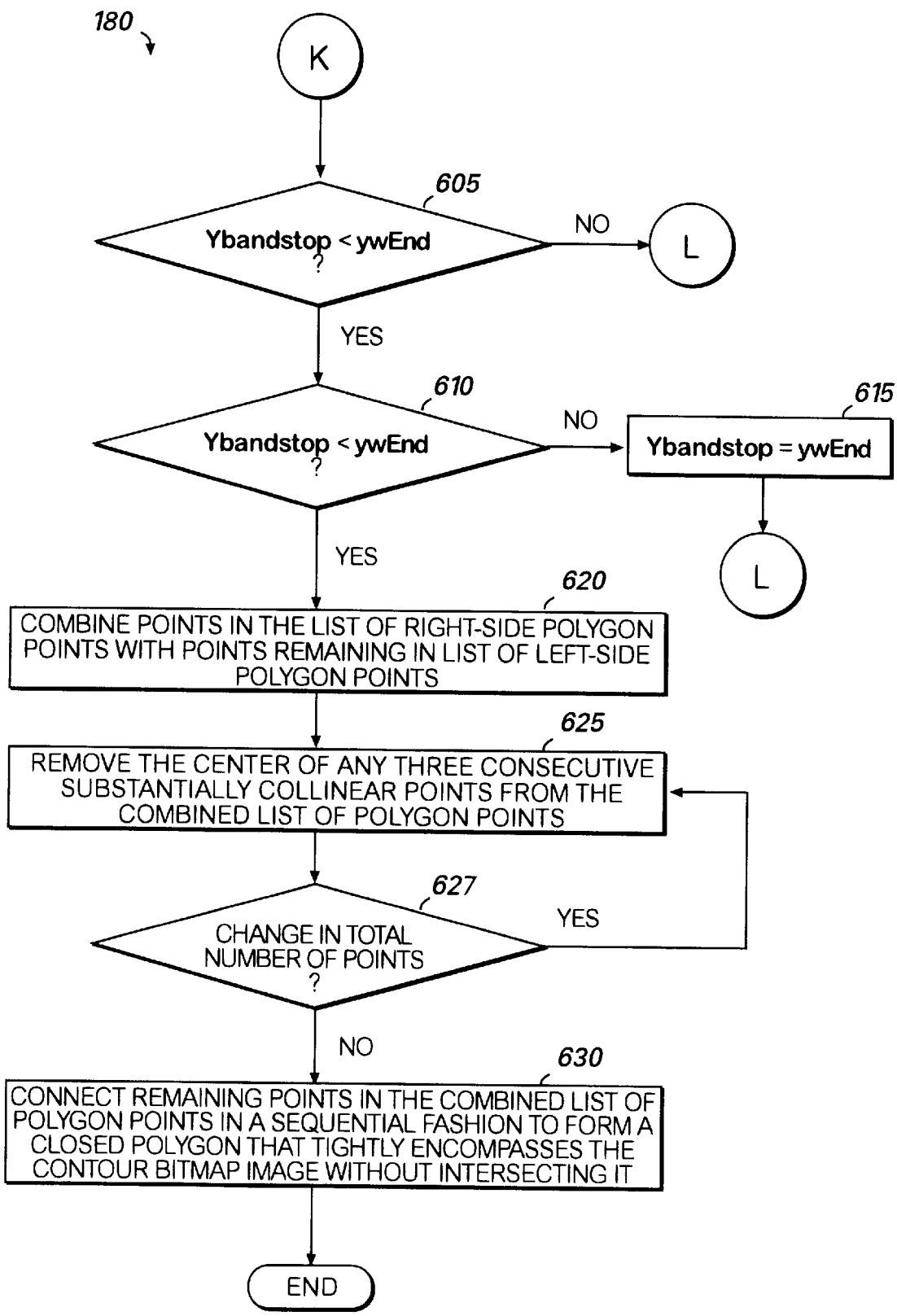

Referring now to FIG. 13K in step 620, the remaining points from the list of left-side polygon points are combined with the points from the list of right-side polygon points. At step 625, this combined list of polygon points is analyzed for substantially collinear points using the same procedure as step 410. Thus, the center point of any three substantially collinear points in the combined list of left-side and right-side polygon points is removed. In step 627, step 625 is repeated until there is no change in the number of points in the combined list of polygon points.

Finally, at step 630, the remaining points in the combined list of polygon points are connected to form a closed polygon that tightly wraps or encompasses the contour bitmap image without clipping or intersecting it.

Figure 14:
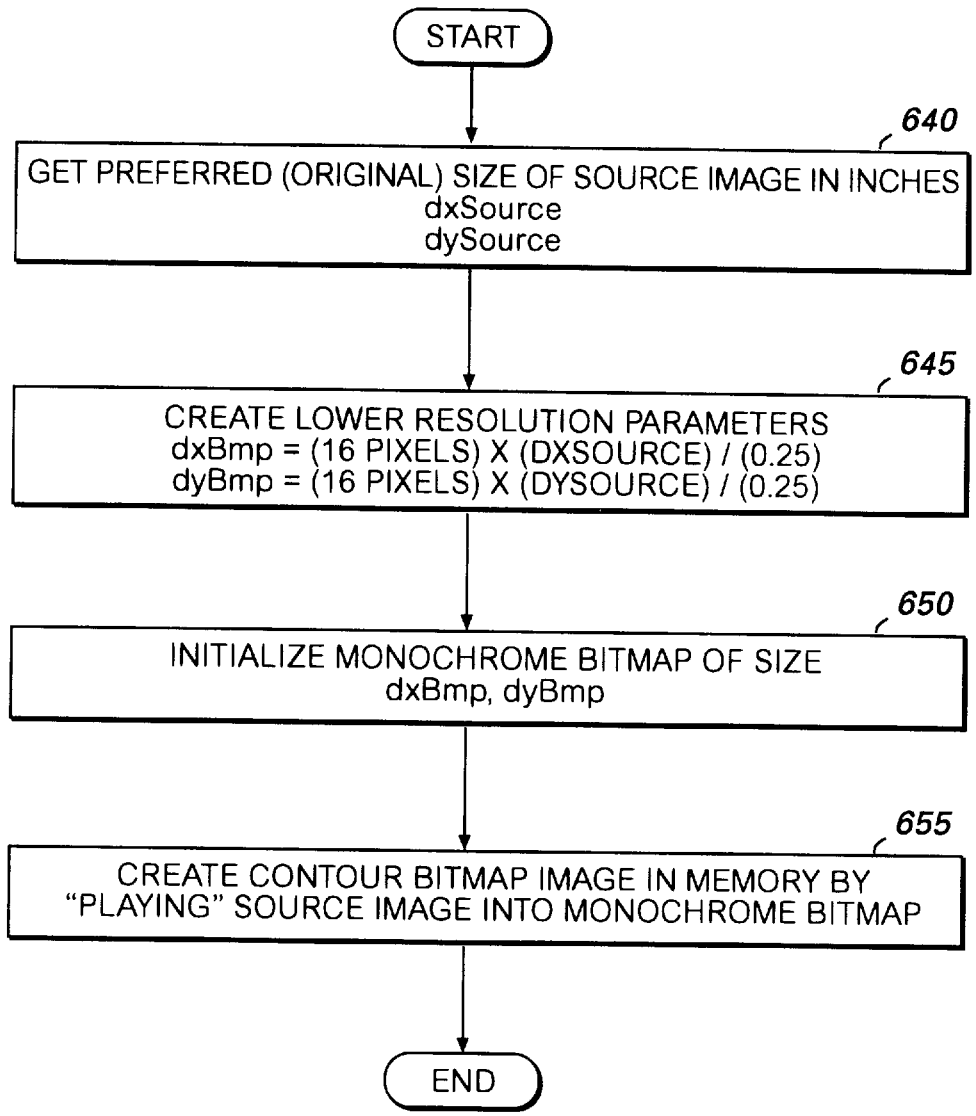
FIG. 14 is a detailed flow diagram illustrating a method of generating a contour bitmap image in memory from a source image.

FIG. 14 is a detailed flow diagram illustrating a method 635 of generating a contour bitmap image from a source image. As previously mentioned, an object can be a graphic image, text, a combination of both graphics and text, or a combination of objects so long as there is a boundary defining each edge of the object. Both the source image and the contour bitmap image are within this class of objects. The contour bitmap image is merely a secondary image used only in memory and is created from the higher resolution source image. While an actual embodiment could proceed using the resolution of the source image itself, a lower resolution contour bitmap image provides a more efficient means of analyzing and referring to the source image in the preferred embodiment of the present invention.

Referring now to FIG. 14 at step 640, the preferred size of the source image is read from the file containing the source image. The preferred size or original dimension of the source image is kept in parameters labeled dxSource and dySource. More particularly, dxSource is the preferred size parameter describing how wide the source image was when originally created. The parameter dySource is the preferred size parameter describing how tall the source image was when originally created.

At step 645, lower resolution parameters, dxBmp and dyBmp, are calculated from the preferred size parameters, dxSource and dySource, respectively. As previously mentioned, the resolution used in creating the lower resolution parameters has been determined empirically by experimentation. In the preferred embodiment, this resolution is 16 points per quarter inch of the source image size.

At step 650, a monochrome bitmap is initialized with a size of dxBmp by dyBmp. After step 650, step 655 creates the contour bitmap image in memory by "playing" the source image into the monochrome bitmap. Those skilled in the art will appreciate that "playing" an image involves converting the information describing the image into device commands such as the graphics device interface (GDI) functions in Microsoft "Windows 95" and "Windows NT." These functions are then processed to create the contour bitmap image in memory. Thus, the contour bitmap image is generated in memory from the source image.

Figure 15:
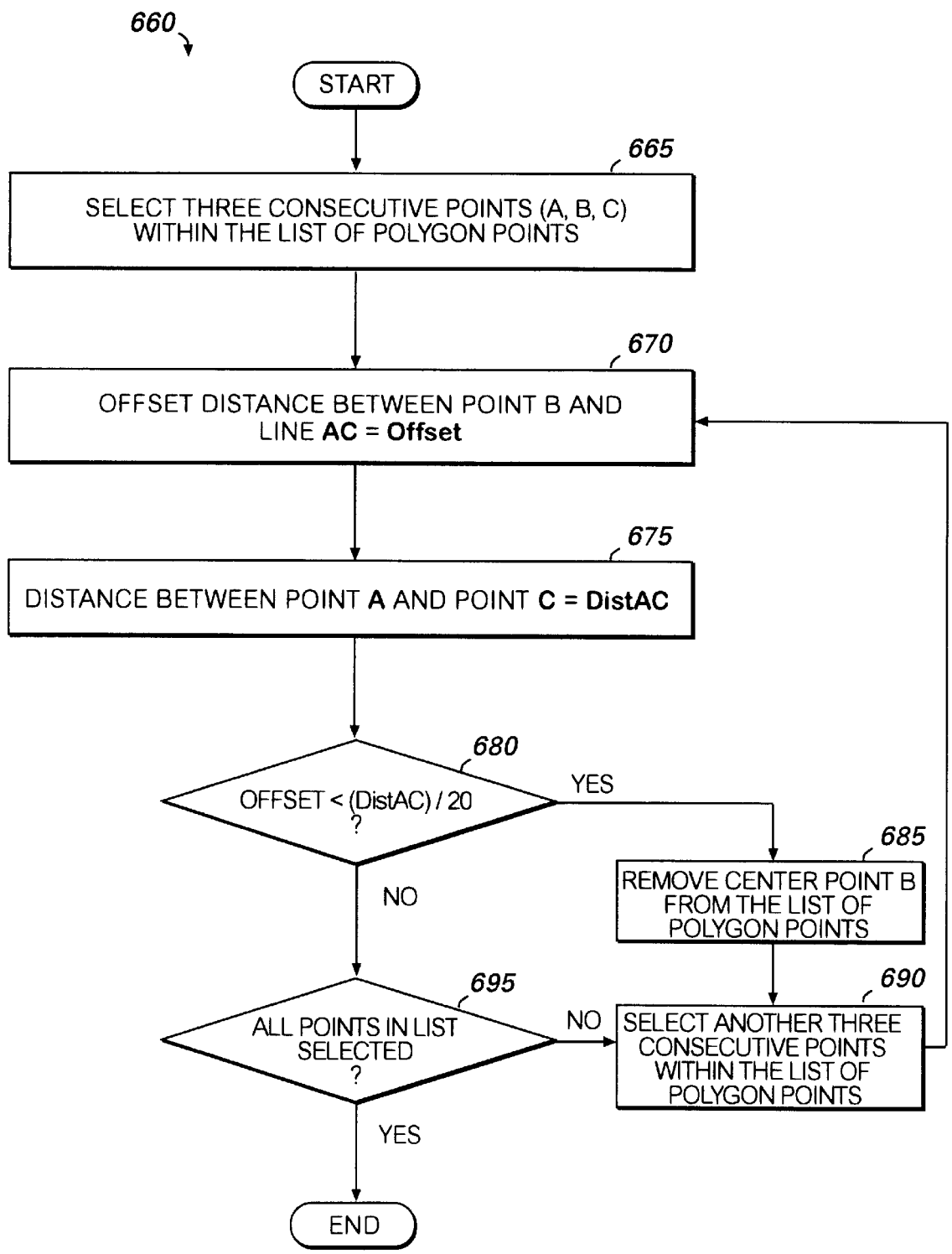
FIG. 15 is a detailed flow diagram illustrating a method of removing substantially collinear points within a set of polygon points.

FIG. 15 is a detailed flow diagram illustrating a method 660 of removing substantially collinear points within a set of polygon points. Inefficiencies occur when the polygon points are sequentially connected and three of the sequential polygon points are collinear or substantially collinear. Therefore, reducing the number of points is highly desirable to conserve computer processing time, conserve computer memory, and make the system more efficient.

Exactly collinear points are rarely found. However, many times three points can come close enough to being collinear whereby the contour bitmap image is still not clipped when the center of the three points is removed from the list.

Referring now to FIG. 15 which corresponds to the illustration in FIG. 9, three consecutive points (A, B, and C) within the list of polygon points are selected at step 665. At step 670, the shortest distance from point B to vector AC is calculated and labeled as the offset distance. At step 675, the distance between points A and C is calculated. At step 680, if the offset distance is less than a threshold offset, proceed to step 685. In the preferred embodiment of the present invention, this threshold offset is determined to be 1/20 of the distance between points A and C. This threshold offset has been determined by experimentation for efficient operation of the preferred method of the present invention.

At step 685, the center point, point B, is removed from the list of polygon points. At step 690, three more consecutive points remaining in the list of polygon points proceeding from step 670.

Returning to step 680, if the offset distance is not less than the threshold offset, point B is retained in the list of polygon points. The method 660 terminates after step 695 if all consecutive points in the list of polygon points have been selected and tested for "substantial collinearity" as implemented in this method 660. Otherwise, the method 660 continues at step 690.

From the foregoing description, it will be appreciated that the present invention provides a system for wrapping a closed polygon around an object where the closed polygon is substantially adjacent to the object without intersecting or clipping it. The object is divided into a number of horizontal threshold bands. Within each threshold band, four points are sequentially positioned along the edge of the object. The first and last points are located immediately proximate to the object on the horizontal boundaries of the threshold band, but do not intersect the object. The middle points lie at the intersections of three lines: a horizontal line containing the first point, a horizontal line containing the last point, and a vertical line just outside the outer most point of the object within the threshold band. In this configuration, line segments between any of the four points do not and cannot intersect the object.

This process of placing four points along the side of the object within a threshold band is then repeated within each of the threshold bands to form a set of polygon points. This set of polygon points is then sequentially connected to form the closed polygon that wraps around the object.

Additionally, before connecting the list of polygon points, the middle points positioned within each threshold band may be individually adjusted by incrementally moving one of the middle two points towards the other of the middle two points along the vertical line until line segments between any of the four points is about to clip or intersect the object. The middle points may then be simultaneously adjusted by incrementally moving one of the middle points towards the first point while incrementally moving the other of the middle points towards the last point. This is performed until line segments between any of said four points is about to clip or intersect the object.

In another aspect, the present invention provides a computer system for wrapping a closed polygon around an object without intersecting the object. The system includes a central processing unit (CPU), an input device for selecting the object, and a pixel-based display device for displaying the object and the closed polygon. The CPU is operative to draw the object on the display. The CPU is further operative to sequentially position four points along the edges of the object within each of the threshold bands by locating the first and last points immediately proximate to the object on the horizontal boundaries of the threshold band, but such that the points do not intersect the object. The CPU is further operative to sequentially position the four points by positioning the middle points at the intersections of three lines: a horizontal line containing the first point, a horizontal line containing the last point, and a vertical line just outside the outer most point of the object within the threshold band. The CPU is further operative to verify that a line segment between any two points does not intersect the object. The CPU is further operative to connect the points to form a closed polygon which is substantially adjacent to the object without intersecting it. Finally, the CPU is further operative to determine if three points are substantially collinear.

The foregoing system may conveniently be implemented in a program module or application program that is based upon the flow charts in FIGS. 11–15. No particular programming language has been required for carrying out the various procedures described above because it is considered that the operations, steps and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. For example, although the present invention has been described in the context of tightly flowing text around an object, those skilled in the art will understand that the principles of the present invention apply to any tasks or processes that require tightly encompassing an object with a closed polygon without intersecting the object. For example, the present invention may be applied to outline an object when performing a background color effect.

Alternative embodiments will become apparent to those skilled in the art to which the present invention pertains without departing from its spirit and scope. Accordingly, the scope of the present invention is defined by the appended claims rather than the foregoing description.

What is claimed is:

1. An improved method for wrapping a closed polygon around an object, the object represented in a computer memory as a plurality of set points in a two-dimensional coordinate system, comprising the computer-implemented steps of:

dividing said object into a plurality of horizontal threshold bands, each of said plurality of horizontal threshold bands having two horizontal boundaries;

sequentially positioning four polygon points within one of said plurality of threshold bands,
 a first one and a last one of said four polygon points being respectively positioned on each of said horizontal boundaries horizontally proximate to one of the plurality of set points but not intersecting said object and
 a pair of middle polygon points of said four polygon points being respectively positioned at intersections of a horizontal line containing said first polygon point, a horizontal line containing said last polygon point, and a vertical line extending between said horizontal boundaries that is proximate to but not intersecting a set point representing the outer most edge of said object within said one of said plurality of threshold bands, a line segment between any two consecutive polygon points of said four polygon points not intersecting said object;

repeating said positioning step for each of said plurality of threshold bands along all sides of said object to form a list of polygon points; and sequentially connecting said polygon points defined by said list to form said closed polygon, said closed polygon being substantially adjacent to said object without intersecting said object.

2. The method of claim 1, further comprising the step, in response to sequentially positioning said four polygon points, of individually adjusting the position of each of said pair of middle polygon points by incrementally moving each of said pair of middle polygon points toward the other of said pair of middle polygon points along said vertical line until the line segment between any two consecutive polygon points of said four polygon points is about to intersect said object.

3. The method claim 2, further comprising the step of simultaneously adjusting the position of both of said pair of middle polygon points by incrementally moving one of said pair of middle polygon points directly toward said first polygon point while incrementally moving the other of said pair of middle polygon points directly toward said last polygon point until the line segment between any two consecutive polygon points of said four polygon points is about to intersect said object.

4. The method of claim 1, further comprising the step of wrapping text around said closed polygon in order to position said text around said object.

5. The method of claim 1, further comprising the step, in response to repeating said positioning step, of removing a center polygon point of any three consecutive polygon points within said list of polygon points that are substantially collinear if a line segment between the two remaining polygon points does not intersect said object.

6. An improved method for wrapping a closed polygon around an object, the object represented in a computer memory as a plurality of set points in a two-dimensional coordinate system, comprising the computer-implemented steps of:

dividing said object into a plurality of horizontal threshold bands, each of said plurality of horizontal threshold bands having two horizontal boundaries;

identifying a left-side and a right-side of said object;

sequentially positioning four polygon points within one of said plurality of threshold bands along said left-side of said object, a first and a last of said four polygon points being respectively positioned on each of said horizontal boundaries proximate to one of the plurality of set points but not intersecting said object, and a pair of middle polygon points of said four polygon points being respectively positioned at intersections of a horizontal line containing said first polygon point, a horizontal line containing said last polygon point, and a vertical line extending between said horizontal boundaries that is proximate to but not intersecting a set point representing the outer most edge of said object within said one of said plurality of threshold bands, a line segment between any two consecutive polygon points of said four polygon points not intersecting said object;

forming a left-side set of polygon points by repeating said positioning step for each of said plurality of threshold bands along said left-side of said object;

forming a right-side set of polygon points by repeating said positioning step but starting along said right-side of said object for each of said plurality of threshold bands along said right-side of said object; and sequentially connecting said left-side set of polygon points and said right-side set of polygon points to form said closed polygon, said closed polygon being substantially adjacent to said object without intersecting said object.

7. The method of claim 6, further comprising the step, in response to sequentially positioning said four polygon points, of individually adjusting the position of each of said pair of middle polygon points by incrementally moving each of said pair of middle polygon points toward the other of said pair of middle polygon points along said vertical line until the line segment between any two consecutive polygon points of said four polygon points is about to intersect said object.

8. The method claim 7, further comprising the step of simultaneously adjusting the position of both of said pair of middle polygon points by incrementally moving one of said pair of middle polygon points toward said first polygon point while incrementally moving the other of said pair of middle polygon points toward said last polygon point until the line segment between any two consecutive polygon points of said four polygon points is about to intersect said object.

9. The method of claim 6, further comprising the steps of:

in response to forming said left-side set of polygon points, removing a center left-side polygon point of any three consecutive left-side polygon points that are substantially collinear if a line segment between the two remaining left-side polygon points does not intersect said object; and in response to forming said right-side set of points, removing a center right-side polygon point of any three consecutive right-side polygon points that are substantially collinear if a line segment between the two remaining right-side polygon points does not intersect said object.

10. The method of claim 6, further comprising the steps of:

in response to forming said left-side set of polygon points, removing a center left-side polygon point of any three consecutive left-side polygon points that are substantially collinear if the line segment between the two remaining polygon points does not intersect said object; and in response to forming said right-side set of points, removing a center polygon point of any three consecutive polygon points within a combination of polygon points remaining in said left-side set of points and said right-side set of points that are substantially collinear if the line segment between the two remaining polygon points in said combination of polygon points does not intersect said object.

11. The method of claim 6, further comprising the step of, in response to forming said right-side set of points, removing a center polygon point of any three consecutive polygon points within a combination of polygon points remaining in said left-side set of polygon points and said right-side set of polygon points that are substantially collinear if the line segment between the two remaining polygon points in said combination of polygon points does not intersect said object.

12. An improved method for wrapping a closed polygon around an object, the object represented in a computer memory as a plurality of set points in a two-dimensional coordinate system, comprising the computer-implemented steps of:

identifying a top most set point and a bottom most set point of said object;

dividing said object into a plurality of horizontal bands;

generating a set of polygon points for the left side of the object from said top most set point to said bottom most set point by (1) defining a current horizontal band of said object to contain said top most set point, (2) positioning a first polygon point (A) proximate to said top most set point within said current horizontal band, said first polygon point (A) not intersecting said object, (3) positioning a second polygon point (B) on a horizontal line containing said first polygon point (A) and to the left of a left most set point defining a left most edge of said object within said current horizontal band, said second polygon point (B) not intersecting said object, (4) positioning a third polygon point (C) on a horizontal line containing a set point defining a bottom most part of said object within said current horizontal band and to the left of said left most edge of said object within said current horizontal band, said third polygon point (C) not intersecting said object, (5) positioning a fourth polygon point (D) proximate to the set point defining the bottom most part of said object within said current horizontal band, said fourth polygon point (D) not intersecting said object, (6) defining a first vector (AB) between said first polygon point (A) and said second polygon point (B), a second vector (BC) between said second polygon point (B) and said third polygon point (C), and a third vector (CD) between said third polygon point (C) and said fourth polygon point (D), (7) adjusting said second polygon point (B) along said second vector (BC) until said first vector (AB) is substantially proximate to but not intersecting said object, (8) adjusting said third polygon point (C) along said second vector (BC) until said third vector (CD) is substantially proximate to but not intersecting said object, (9) simultaneously adjusting said second polygon point (B) toward said first polygon point (A) along said first vector (AB) and said third polygon point (C) toward said fourth polygon point (D) along the third vector (CD) until either said second vector (BC) is substantially proximate to but not intersecting said object or said second polygon point (B) is located in substantially the same location as said first polygon point (A) or said third polygon point (C) is located in substantially the same location as said fourth polygon point (D),

(10) adding the two-dimensional coordinates of said first, second, third, and fourth polygon points to said left-side set of points,

(11) redefining said current horizontal band by selecting said horizontal band located immediately below said current band,

(12) conducting steps (2) through (11) for each of the remaining horizontal bands;

generating a set of polygon points for the right side of the object from said bottom most set point to said top most set point by redefining said current horizontal band of said object to contain said bottom most set point, and repeating steps (1) through (12) for each of the remaining horizontal bands exchanging orientation references of "left" with "right", "up" with "down", and "top" with "bottom"; and connecting adjacent polygon points within said left-side set of polygon points and said right-side set of polygon points to form said closed polygon, said closed polygon being substantially adjacent to said object without intersecting said object.

13. The method of claim 12, further comprising the steps of:

in response to generating said left-side set of polygon points, removing a center left-side polygon point of any three consecutive left-side polygon points that are substantially collinear if a line segment between the two remaining left-side polygon points does not intersect said object; and in response to generating said right-side set of polygon points, removing a center right-side polygon point of any three consecutive right-side polygon points that are substantially collinear if a line segment between the two remaining right-side polygon points does not intersect said object.

14. The method of claim 12, further comprising the steps of:

in response to generating said left-side set of polygon points, removing a center left-side polygon point of any three consecutive left-side polygon points that are substantially collinear if the line segment between the two remaining left-side polygon points does not intersect said object; and in response to generating said right-side set of polygon points, removing a center polygon point of any three consecutive polygon points within a combination of polygon points remaining in said left-side set of polygon points and said right-side set of polygon points that are substantially collinear if the line segment between the two remaining polygon points in said combination of polygon points does not intersect said object.

15. The method of claim 12, further comprising the step of, in response to generating said right-side set of points, removing a center polygon point of any three consecutive polygon points within a combination of polygon points remaining in said left-side set of polygon points and said right-side set of polygon points that are substantially collinear if the line segment between the two remaining polygon points in said combination of polygon points does not intersect said object.

16. A computer system for wrapping a closed polygon around an object, the object represented in a computer memory as a plurality of set points in a two-dimensional coordinate system, the computer system comprising:

a central processing unit (CPU);

an input device coupled to said CPU for selecting said object;

a pixel-based display device coupled to said CPU for displaying said object and said closed polygon; and said CPU being operative to:
draw said object on said display device,
divide said object into a plurality of horizontal threshold bands, each of said plurality of horizontal bands having two horizontal boundaries,
position four polygon points in a sequential manner along the edge of said object within each of said plurality of horizontal bands to form a plurality of polygon points, a first one and a last one of said four polygon points being respectively positioned on each of said horizontal boundaries horizontally proximate to one of the plurality of set points but not intersecting said object, a pair of middle polygon points of said four polygon points being respectively positioned at intersections of a horizontal line containing said first polygon point, a horizontal line containing said last polygon point, and a vertical line extending between said horizontal boundaries that is proximate to but not intersecting a set point representing the outer most edge of said object within said one of said plurality of threshold bands, a line segment between any two consecutive polygon points of said four polygon points not intersecting said object, verify that the line segment between any two consecutive polygon points of said plurality of polygon points does not intersect said object, and connect said plurality of polygon points to form said closed polygon, said closed polygon being substantially adjacent to said object without intersecting said object.

17. The system of claim 16, wherein said CPU is further operative to remove a center polygon point of any three consecutive polygon points within said plurality of polygon points that are substantially collinear if a line segment between the two remaining polygon points does not intersect said object.

18. A computer system for wrapping a closed polygon around an object, the object represented in a computer memory as a plurality of set points in a two-dimensional coordinate system, the computer system comprising:

a central processing unit (CPU);

an input device coupled to said CPU for selecting said object;

a pixel-based display device coupled to said CPU for displaying said object; and said CPU being operative to:

draw said object on said display device, said object having a left-side and a right-side, divide said object into a plurality of horizontal threshold bands, each of said plurality of horizontal bands having two horizontal boundaries, position four left-side polygon points in a sequential manner along said left-side of said object within each of said plurality of horizontal bands to form a left-side set of polygon points, a first one and a last one of said four left-side polygon points being respectively positioned on each of said horizontal boundaries horizontally proximate to one of the plurality of set points but not intersecting said object and;

a pair of middle left-side polygon points of said four left-side polygon points being respectively positioned at intersections of a horizontal line containing said first left-side polygon point, a horizontal line containing said last left-side polygon point, and a vertical line extending between said horizontal boundaries that is proximate to but not intersecting a set point representing the outer most edge of said object within said one of said plurality of threshold bands, a line segment between any two consecutive left-side polygon points of said four left-side polygon points not intersecting said object, position four right-side polygon points in a sequential manner along said right-side of said object within each of said plurality of horizontal bands to form a right-side set of polygon points, said four right-side polygon points being positioned in the same manner along said right-side of said object as said four left-side polygon points are positioned along said left-side of said object, and connect said left-side set of polygon points and said right-side set of polygon points to form said closed polygon, said closed polygon being substantially adjacent to said object without intersecting said object.

19. The system of claim 18, wherein said CPU is further operative to remove a center left-side polygon point of any three consecutive left-side polygon points that are substantially collinear if a line segment between the two remaining left-side polygon points does not intersect said object.

20. The system of claim 18, wherein said CPU is further operative to remove a center right-side polygon point of any three consecutive right-side polygon points that are substantially collinear if a line segment between the two remaining right side polygon points does not intersect said object.

21. The system of claim 18, wherein said CPU is further operative to remove a center polygon point of any three consecutive polygon points within a combined list of polygon points formed by said left-side set of left-side polygon points and said right-side set of right-side polygon points that are substantially collinear if a line segment between the two remaining polygon points does not intersect said object.

22. A computer-readable medium on which is stored computer-executable instructions for performing the steps of claim 1.

23. The computer-readable medium of claim 22, wherein said computer-executable instructions further perform the step, in response to repeating said positioning step, of removing a center polygon point of any three consecutive polygon points within said list of polygon points that are substantially collinear if a line segment between the two remaining polygon points does not intersect said object.

* * * * *